(12) United States Patent
Belgaied et al.

(10) Patent No.: US 11,301,324 B2
(45) Date of Patent: Apr. 12, 2022

(54) METHOD AND APPARATUS FOR CONSISTENT AND HIGHLY AVAILABLE DATA STORAGE USING LOCAL AND FABRIC ATTACHED NON-VOLATILE MEMORY STORAGE DEVICES

(71) Applicant: Sanmina Corporation, San Jose, CA (US)

(72) Inventors: Kais Belgaied, San Jose, CA (US); Richard Elling, Ramona, CA (US); Franz Michael Schuette, Colorado Springs, CO (US)

(73) Assignee: SANMINA CORPORATION, San Jose, CA (US)

( * ) Notice: Subject to any disclaimer, the term of this patent is extended or adjusted under 35 U.S.C. 154(b) by 123 days.

(21) Appl. No.: 16/794,200

(22) Filed: Feb. 18, 2020

(65) Prior Publication Data
US 2020/0264954 A1    Aug. 20, 2020

Related U.S. Application Data

(60) Provisional application No. 62/806,517, filed on Feb. 15, 2019.

(51) Int. Cl.
| G06F 11/10 | (2006.01) |
| G06F 13/42 | (2006.01) |
| G06F 13/40 | (2006.01) |
| G06F 12/10 | (2016.01) |

(52) U.S. Cl.
CPC .......... G06F 11/1076 (2013.01); G06F 12/10 (2013.01); G06F 13/4022 (2013.01); G06F 13/4282 (2013.01); G06F 2212/262 (2013.01)

(58) Field of Classification Search
CPC .................................................... G06F 11/1076
USPC ................................. 714/764, 770, 765, 762
See application file for complete search history.

(56) References Cited

U.S. PATENT DOCUMENTS

| 8,325,554 B2* | 12/2012 | Sweere | G06F 12/0866 365/229 |
| 2014/0181034 A1* | 6/2014 | Harrison | G06F 16/27 707/646 |
| 2020/0042380 A1* | 2/2020 | Roberts | G06F 11/1092 |
| 2020/0042390 A1* | 2/2020 | Roberts | G06F 11/1464 |

* cited by examiner

*Primary Examiner* — Fritz Alphonse
(74) *Attorney, Agent, or Firm* — Loza & Loza, LLP; Julio Loza

(57) ABSTRACT

A server computer is configured to write a first copy of a block of data to a first namespace on a first non-volatile memory-based cache drive and a second copy of the block of data to a RAID controller for de-staging of the data to hard disk drives of a RAID array. Acknowledgment of hardening of the data on the hard disk drives initiates purging of the first copy of the block of data from the cache drive. High availability is enabled by writing a third copy of the block of data to a second server to store the block of data in a second namespace on a second non-volatile memory-based cache drive. Restoring of data after power loss accesses the data on the first non-volatile memory-based cache drive.

11 Claims, 17 Drawing Sheets

METHOD AND APPARATUS FOR CONSISTENT AND HIGHLY AVAILABLE DATA STORAGE USING LOCAL AND FABRIC ATTACHED NON-VOLATILE MEMORY STORAGE DEVICES

This application claims priority under 35 U.S.C. § 119 to U.S. Provisional Application No. 62/806,517 entitled, "Method and Apparatus for Consistent and Highly Available Data Storage using Local and Fabric Attached Non-Volatile Memory Storage Devices," filed Feb. 15, 2019, and hereby expressly incorporated by reference herein.

FIELD

The various features relate to memory devices to be used with computers and other processing apparatuses. More particularly, one aspect relates to solid state drives as complement for a redundant array of independent drives configuration using hard disk drives in a high availability system.

BACKGROUND

One of the most important features for enterprise level computing systems is high availability. That is, enterprise level computing systems should be able to afford to lose some or any of its components without losing functionality or incur catastrophic data loss. On the system level this means that the mass storage media, or drives, are accessible by more than one server to avoid a single point of failure. In a direct-attached configuration using dual ported drives, the failure of a single server does not affect the availability of the data stored on the array since the second server can still access all drives via the second port. In a fabric-attached storage array, the fault tolerance may relate more to a failure of a fabric switch as the final interface to the drive array but the connections may be replicated via two ports for each drive, thereby providing a similar fault tolerance.

Related to this problem is the redundancy on the device level (e.g., failure of a drive in an array). An easy method to overcome this problem is to mirror all drives, however, this method is extremely costly and inefficient from a power and footprint (e.g., physical space) perspective because it requires duplication of all drives. Redundancy can be achieved by striping the data across multiple devices of a redundant array of independent drives (RAID) and then calculating the parity information and storing it on either a dedicated device or else using distributed parity information (e.g., storing the parity information in a round robin scheme across the entire array).

A known vulnerability of RAID configurations is the issue of power loss or controller failure, both in hardware and software. When such event occurs, stripes of data and parity blocks may be left in an inconsistent state, resulting in a mix of new and old data blocks including a mix of new and old parity blocks that no longer match the data blocks. Because of the mismatch between the data and the parity information, it is not possible to recover the old value of the data blocks, nor is it possible to reconstruct a damaged stripe. Forcing reconstruction leads to data corruption, whereas skipping the non-recoverable stripes causes data loss.

This problem is generally referred to as the RAID write hole. That is, the gap between the time when the data set is striped and the parity information is calculated, and the actual commitment of the data to the storage media. A common practice to address the write hole is to use either transactional or journaling memory to log all ongoing transactions and keep track of completed vs. incomplete storage of data or else to fast write a journal link.

However, journaling and using transactional memory does not address the issue of controller failure. In this case, the journaling memory or storage device itself may be corrupted. Even if the entire computer system is built for high availability, this may result in data loss. In light of the above, it is clear that a better and more reliable solution is needed to guarantee complete data protection in a high availability system.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect of the invention, a non-volatile memory functioning as a write cache is mirrored across two RAID groups. Host writes are committed as transactional data to the cache drive serving as a front end first and then de-staged to the RAID array as back-end of the storage. A first non-volatile memory cache drive, direct-attached to a first server, may contain two namespaces, one of which caches all write transactions for a first RAID group of hard disk drives directly associated with the drive, the other one caches all write transactions for a second RAID group of NVMe drives. A second non-volatile memory journaling drive, direct attached to a second server, also contains two name spaces with the same cached transactional writes that are stored in the first non-volatile memory drive. There is no direct connection between the first and the second non-volatile memory cache drives but coherency of the data is maintained by mirroring the first server to the second server through a non-transparent bridge between the central processing units. All updates to the data for both arrays are written as transactional blocks to both cache drives via the respective data paths, consequently, at least under normal operational conditions, the transactional blocks on both drives are identical and it suffices to only read the local copy. By extension, it is not necessary to read both copies of the block, instead the local copy suffices, which eliminates inter-array communication.

The transactional mirroring may use any data format, including but not limited to bit, byte or block-based data structures as long as they are suitable for caching and subsequent destaging of the data. Suitable protocols include Remote Direct Memory Access (RDMA), iSCSI, Non-Volatile Memory Express (NVMe) over Fabric (NVMeoF) and others.

In another aspect of the invention, two mirrored write cache NVMe drives may be part of an iSCSI RAID array over Fabric using an NVMe drive as front end. The iSCSI initiators are highly available servers or controllers (A & B) and the transactional data are written in parallel to the two NVMe drives. The two NVMe drives may be part of a centralized NVMe appliance serving as write cache for a plurality of RAID arrays behind the NVMe appliance.

One aspect of the invention is a computer system using a file system and comprising a server computer including a central processing unit (CPU), a system memory, a redundant array of independent disks (RAID) controller coupled to a plurality of hard disk drives forming a RAID array. A non-volatile memory-based solid state mass storage device may be coupled to the CPU. The non volatile memory-based solid state mass storage device is configured to receive and store a first copy of a block of data. The RAID controller is configured to obtain/receive a second copy of the block of data and to convert the second copy of the block of data into data stripes, and to generate parity information of the data block. The RAID controller then stores the data stripes and parity information on the hard disk drives forming the RAID array.

The hard disk drives may then acknowledge the hardening of the data stripes and parity information to the RAID controller. The RAID controller may then send an acknowledge signal to the file system followed by the file system sending a signal to the non-volatile memory-based mass storage device to invalidate the first copy of the block of data.

The non-volatile memory-based mass storage device may be a non-volatile memory express (NVMe) drive. To maintain data coherency, the data may be read by the NVMe drive and by the RAID controller from the same location in the system memory.

In another aspect, the data may be read by the NVMe drive from the system memory and then forwarded to the RAID controller using address translation services through the PCIe root complex of the CPU.

In yet another aspect, the data may be read by the NVMe drive from the system memory and then forwarded through a PCIe switch to the RAID controller using access control services (which are part of the PCIe protocol).

In another aspect of the invention, redundancy may be provided through a first computer server coupled to a second computer server, the two computer servers in combination comprising a high availability computer system. A first computer system may include a first CPU, a first system memory, a first redundant array of independent disks (RAID) controller coupled to the first CPU and to a plurality of hard disk drives forming a first RAID array, and a first non-volatile memory express (NVMe) drive coupled to the first CPU, the first computer system using a first file system. A second computer system may include a second CPU, a second system memory, a second redundant array of independent disks (RAID) controller coupled to the second CPU and to a plurality of hard disk drives forming a second RAID array, and a second NVMe drive coupled to the second CPU, the second computer system using a second file system, wherein the first computer system is coupled to the second computer system. The first NVMe drive may be configured to: receive and store a first copy of a block of data. The first RAID controller may be configured to: obtain/receive a second copy of the block of data, convert the second copy of the block of data into data stripes, generate parity information for the data stripes, and store the data stripes and parity information on the hard disk drives forming the first RAID array.

Upon the hard disk drives of the first RAID array acknowledging the hardened storage of the data stripes and parity information to the first RAID controller, the first RAID controller may send an acknowledge signal to the first file system. The first file system may then send a signal to the first NVMe drive to invalidate the first copy of the block of data in the first NVMe. The data written to a first namespace on the first NVMe drive are copied through a non-transparent bridge between the first CPU and the second CPU and written to a first namespace on the second NVMe drive.

Additionally, the second NVMe drive may be configured to receive and store a first copy of another block of data. The second RAID controller may be configured to: obtain/receive a second copy of the other block of data, convert the second copy of the other block of data into data stripes, generate parity information for the data stripes, and store the data stripes and parity information on the hard disk drives forming the second RAID array. Data written by the second CPU are stored in a second namespace of the second NVMe drive, the data are then copied through the non-transparent bridge to the first CPU and written to a second namespace on the first NVMe drive.

After a power loss, a first block of data in the first namespace of the first NVMe drive is copied to the first RAID controller and a second block of data in the second namespace of the second NVMe drive is copied to the second RAID controller.

Yet another aspect provides, a non-volatile memory-based cache appliance that may include a plurality of NVMe drives, wherein each NVMe drive has at least one namespace, and the NVMe drives may be coupled to a fabric switch. The fabric switch may be coupled between a first server computer and a second server computer, each of the first and second server computers including a central processing unit (CPU), a system memory, and a redundant array of independent disks (RAID) controller coupled to a RAID array of hard disk drives.

The first server computer may be configured write a first copy of a block of data to a first namespace on a first NVMe drive of the plurality of NVMe drives followed by writing a second copy of the block of data to the RAID controller of the first server computer. The RAID controller for the first server computer may be configured to stripe the data and generate parity information for the block of data. The RAID controller may then write the striped data and parity information to the array of hard disk drives for the first server computer. These hard drives may then return an acknowledge signal upon storing/hardening the data. The acknowledge signal may be used to initiate purging the first block of data from the first namespace on the first NVMe drive.

The CPUs of the first server and the second server may be communicating via a non transparent bridge; and a third copy of the block of data is copied via the non transparent bridge from the CPU of the first server to the CPU of the second server; and the CPU of the second server writes a fourth copy of the block of data to a first namespace on a second NVMe drive of the appliance.

The acknowledge signal of hardening of the data on the hard disk drives is communicated from the CPU of the first server to the CPU of the second server; and the CPU of the second server is using the acknowledge signal received from the CPU of the first server to initiate the purging of data of the first namespace on the second NVMe drive.

Yet another aspect provides a distributed cache system comprising a plurality of non-volatile memory-based cache appliances, each cache appliance having a plurality of non-volatile memory express (NMVe) drives coupled to at least a first fabric switch and a second fabric switch, each NVMe drive defining at least one namespace, the first fabric switch is coupled to at least a first server computer and the second fabric switch is coupled to a second server computer, each of the server computers having a central processing unit (CPU), a system memory and a redundant array of independent disks (RAID) controller coupled to a RAID array of hard disk drives, the CPUs of the first and the second server computers are coupled via a high speed interface.

The first server computer may write a first copy of a block of data to a first namespace on a first NVMe drive of the plurality of NVMe drives in a first cache appliance. The CPU of the first server computer may write a second copy of the block of data to the CPU of the second server computer. The second server computer may then write the second copy of the block of data to a first namespace on a first NVMe drive of the plurality of NVMe drives in a second cache appliance.

The first server may write a third copy of the block of data to the RAID controller configured for striping and generating parity information of the data, followed by the RAID controller then writing the striped data and parity information to the array of hard disk drives.

When the RAID array of hard disk drives return an acknowledge signal, upon hardening/storage of the data, to the CPU of the first server computer, the acknowledge signal is used to initiate purging the first copy of the block of data from the first namespace on the first NVMe drive in the first cache appliance.

The acknowledge signal may also be forwarded from the CPU of the first server computer to the CPU of the second server computer, the acknowledge signal is used to initiate purging of the second copy of the block of data from the first NVMe drive of the plurality of NVMe drives in the second cache appliance.

The high speed interface between the CPU of the first server computer and the CPU of the second server computer may be a non-transparent bridge.

DETAILED DESCRIPTION

In the following detailed description of the invention, numerous specific details are set forth in order to provide a thorough understanding of the invention. However, the invention may be practiced without these specific details. In other instances, well known methods, procedures, and/or components have not been described in detail so as not to unnecessarily obscure aspects of the invention.

In the following description, certain terminology is used to describe certain features of one or more embodiments. The terms "mass storage device" and/or "storage drive" may refer to a hard disk drive (HDD), a solid state drive in any form factor or any type of mass storage media for storing data. The term non-volatile write cache may refer to non-volatile memory used as a front end for de-staging data to a distributed back-end storage array using any non-volatile memory-based mass storage device including but not limited to hard disk drives and solid state drives. Non-volatile memory may refer to rotating magnetic media, NAND and NOR flash, phase change memory, optical memory, magnetic random-access memory (MRAM), resistive random-access memory (RRAM), ferroelectric random-access memory (FRAM), 3D Crosspoint (3DXP) and other substrates to store electronic data. For simplification of the disclosure and ease of understanding, the non-volatile memory express (NVMe) protocol is used as exemplary instantiation of an interface from the host server to the non-volatile memory-based cache drive but any previous, emerging, or superseding protocols (e.g., disaggregated memory over Gen-Z, etc.) are contemplated and within the scope of the invention.

Figure 1A:
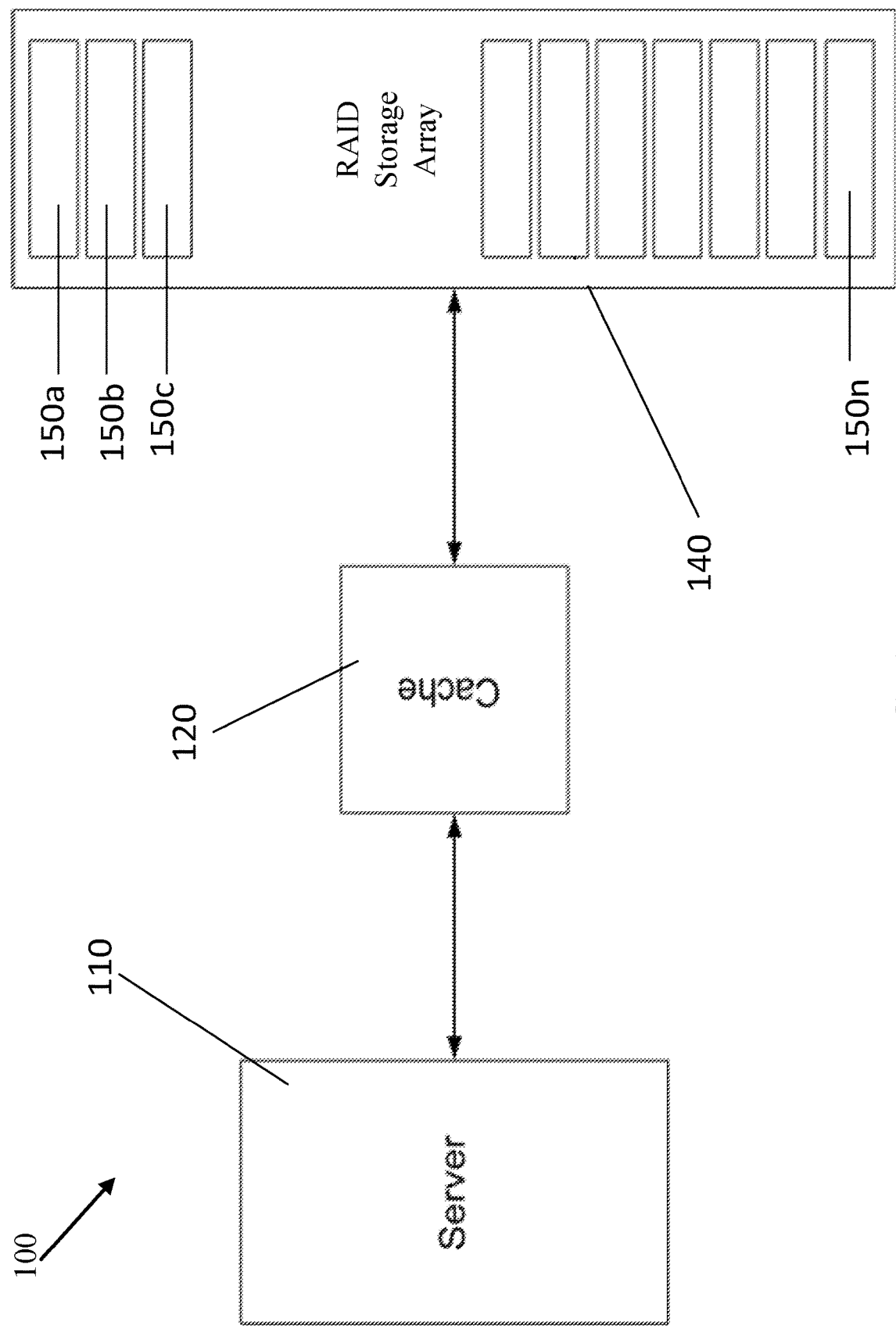
FIG. 1A illustrates an exemplary computer system including a hierarchical storage array in which a block of data is written to a non-volatile cache drive and then copied to a back-end RAID storage array comprising a number of hard disk drives.

FIG. 1A illustrates an exemplary computer system 100 including a hierarchical storage array in which a block of data is written to a non-volatile cache drive 120 and then copied to a back-end RAID storage array 140 comprising a number of hard disk drives 150. In one example, the computer system 100 may include a server 110 (e.g., processing circuit, processor(s), etc.) coupled to the non-volatile cache drive 120. The non-volatile cache drive 120 may be functionally coupled to the RAID storage array 140 which includes the disk drives 150a-n. A file or object may be written to the RAID storage array 140 but intermittently stored in the non-volatile cache 120, which acknowledges the completion of the write process while the data are de-staged in the background to the RAID storage array 140.

The electromechanical nature of the hard disk drives (HHDs) 150*a-n* results in inherent seek and rotational latencies. In addition, the hard disk drives 150*a-n* themselves are queuing the write blocks according to the most advantageous pattern of writing them, thereby partially mitigating the electromechanical latencies but at the same time introducing out of order writes of the blocks at the individual logical block addresses (LBAs) of the hard disk drives 150*a-n*. Combined, these processes cause delays and de-synchronization of logical versus physical data storage. In addition, striping and parity calculations add another layer of latency.

In some cases, the data writing process is susceptible to potentially catastrophic consequences due to a sudden power failure. For instance, the server 110 may have written the data to the cache 120 which may be the memory associated with a RAID controller and the data are then de-staged (e.g., written) to the HDDs 150*a-n*. The HDDs 150*a-n* receive the data and temporarily store them in a local volatile memory or queue before internally rearranging the data into logical blocks that are written to logical block addresses in an order that causes the least amount of head movement and rotational latency of the disk drive 150*a-n*. In other words, data fragments are written in no particular order to the media (HDDs 150*a-n*). In case of a power loss, the tail end or middle section of a stripe block of data may have been written (e.g., to an HDD) but the front part of the stripe block of data may be missing altogether. Moreover this problem is multiplied by the number of hard disk drives contributing to the RAID array, including the parity block, and any missing piece of data across the entire stripe array will render the entire data set useless.

A common solution to the problem is to turn off write caching on the disk drives so that no data are transiently stored in the drive's volatile memory-based write cache. This mitigates the risk for data loss or corruption since an acknowledgement of the completed data writes is only issued after the data are hardened (e.g., stored) on the non-volatile media, for example the platters of the hard drive, instead of being stored in the drive's cache. However, this also comes at a performance degradation and does not necessarily solve the problem of out of order writing as enabled by tagged command queuing.

According to one aspect, a non-volatile memory device (e.g., an NVMe drive/cache) may be used to cache the data to be written to the RAID storage array 140 and then de-stage the data to the individual stripe blocks on the HDDs 150*a-n*.

Figure 1B:
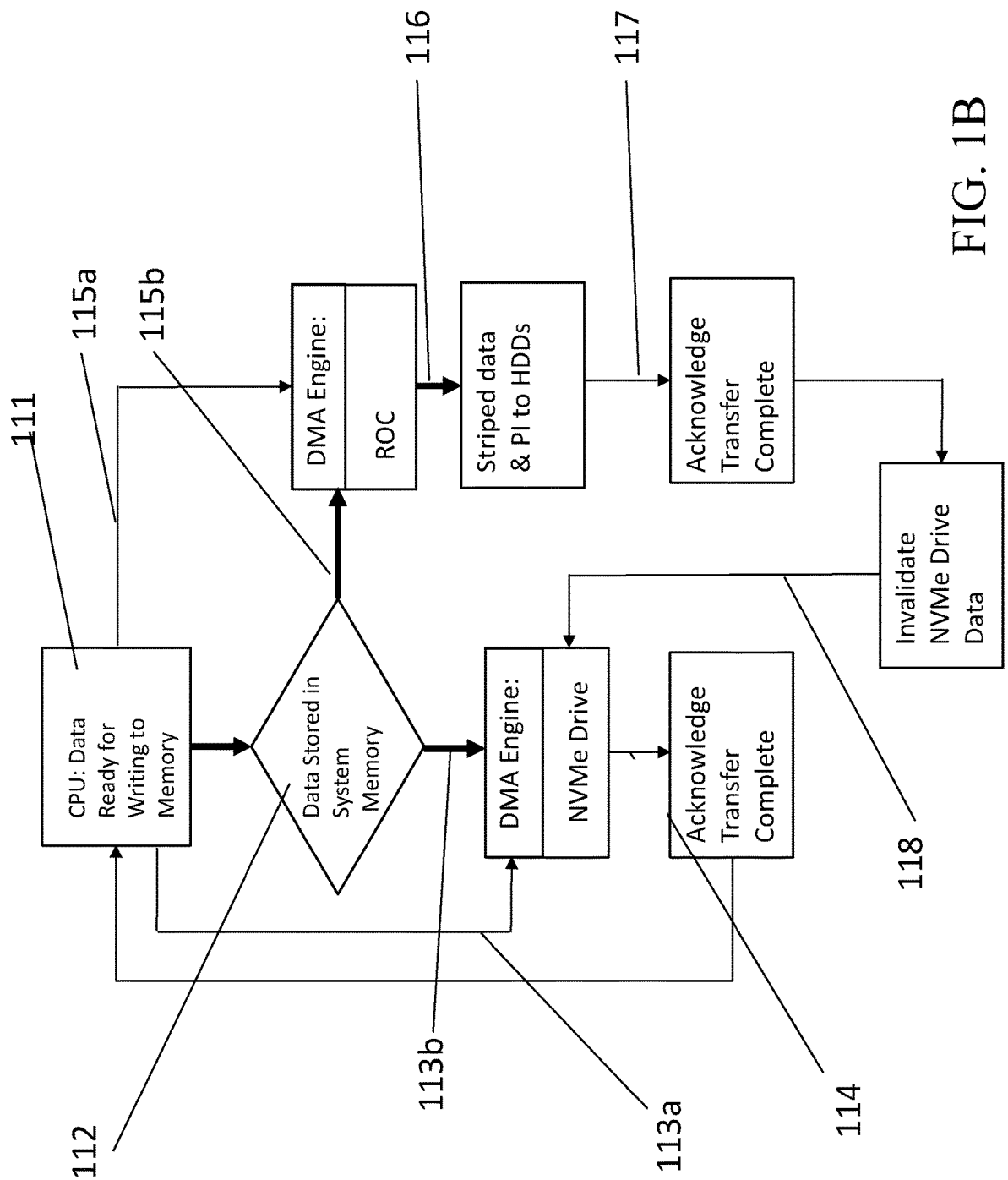
FIG. 1B illustrates an exemplary method for write caching to a non-volatile journaling drive.

FIG. 1B illustrates an exemplary method for write caching to a non-volatile journaling drive. Once a file system running on a CPU (e.g., server) has generated data to be written 111 to a storage device, the data are first written to the system memory 112, and substantially concurrent, a non-volatile memory (NVMe) drive is instructed 113*a* to set up its DMA engine to load 113*b* the data from the specified address in the system memory. As soon as the data are hardened (stored) in the NVMe drive/cache, the NVMe drive/cache acknowledges 114 the transfer is complete to the CPU which then instructs 115*a* a RAID-On-Chip (ROC) controller to set up its direct memory access (DMA) engine to request and load 115*b* the same data from the system memory using a copy of the same memory address used by the NVMe drive/cache for its DMA. The ROC may be an integrated chip-down solution or else be deployed as a RAID controller card using a PCIe or similar system interface. The ROC computes the individual data stripe and parity information (PI) blocks and writes the stripe data and PI 116 to the hard disk drives. As soon as the transfer is complete and the data are hardened on the HDDs, an acknowledgement 117 is used to send an instruction to invalidate 118 the data on the NVMe drive/cache. This is typically done by updating or deleting the pointer to the metadata table but other methods may be possible. Invalidating 118 the data stored in the NVMe drive/cache acts as in indicator that they have been fully stored in the RAID storage (HDDs).

Figure 2A:
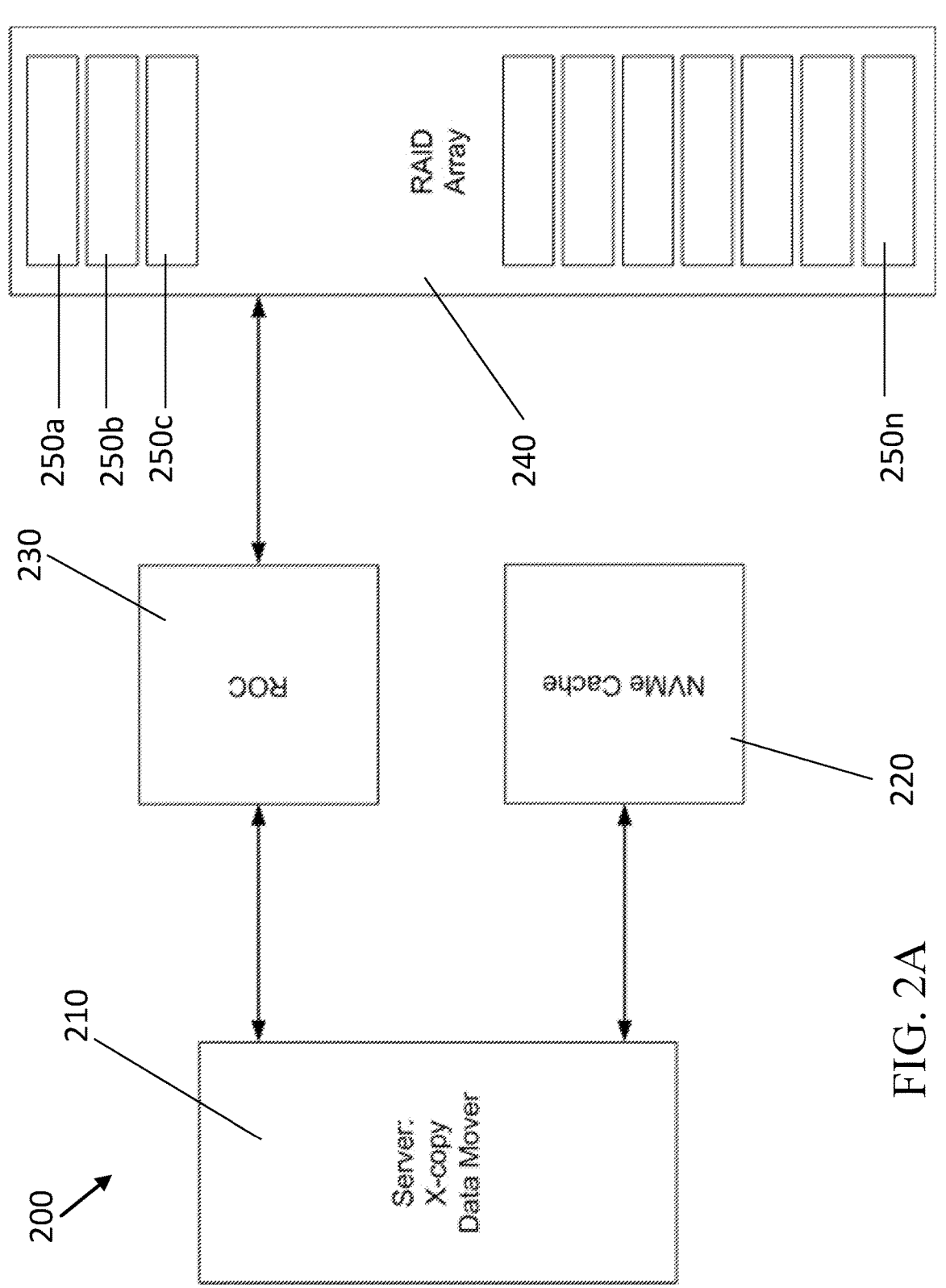
FIG. 2A illustrates an exemplary block diagram of a server system in which data are written concurrently to non-volatile memory cache and a RAID on chip (ROC).

FIG. 2A illustrates an exemplary block diagram of the server system 200 in which data are written concurrently to a non-volatile memory cache and a RAID on chip (ROC). The server 210 writes the data to a non-volatile cache or transactional memory 220 and issues a (concurrent or sequential) second write request to the ROC 230. The ROC 230 may break up the data into the individual stripe blocks and calculates Hamming, Reed-Solomon, Bose Chaudhuri Hocquenghem (BCH) code or other parity information to be stored in the parity stripe block of the RAID array 240. The stripe blocks are written to the hard disk drives (HDDs) 250*a-n* and as soon as all write transactions are complete, that is, the data have been committed to the RAID storage 240, i.e. platters of the HDDs 250*a-n*, the pointer to the metadata entry for the data on the NVMe drive/cache 220 is invalidated to allow recycling of the non-volatile memory blocks through garbage collection. Garbage collection for freeing up memory locations may be relevant in the case of flash memory-based devices and other memory technologies using append mode. Other non-volatile media like MRAM or 3DXP may not require this step because the data can be simply overwritten.

If a power outage occurs at any given time while data are in-flight (e.g., in the processes of being written to the RAID array 240), and results in incomplete fragments of data within the RAID array 240 or any drive 250*a-n* therein, the complete data set can be copied back (e.g., recovered) from the NVMe drive/cache 220 to system memory and then re-written to the ROC 230 for de-staging to the HDDs 250*a-n* in the RAID array group 240.

Figure 2B:
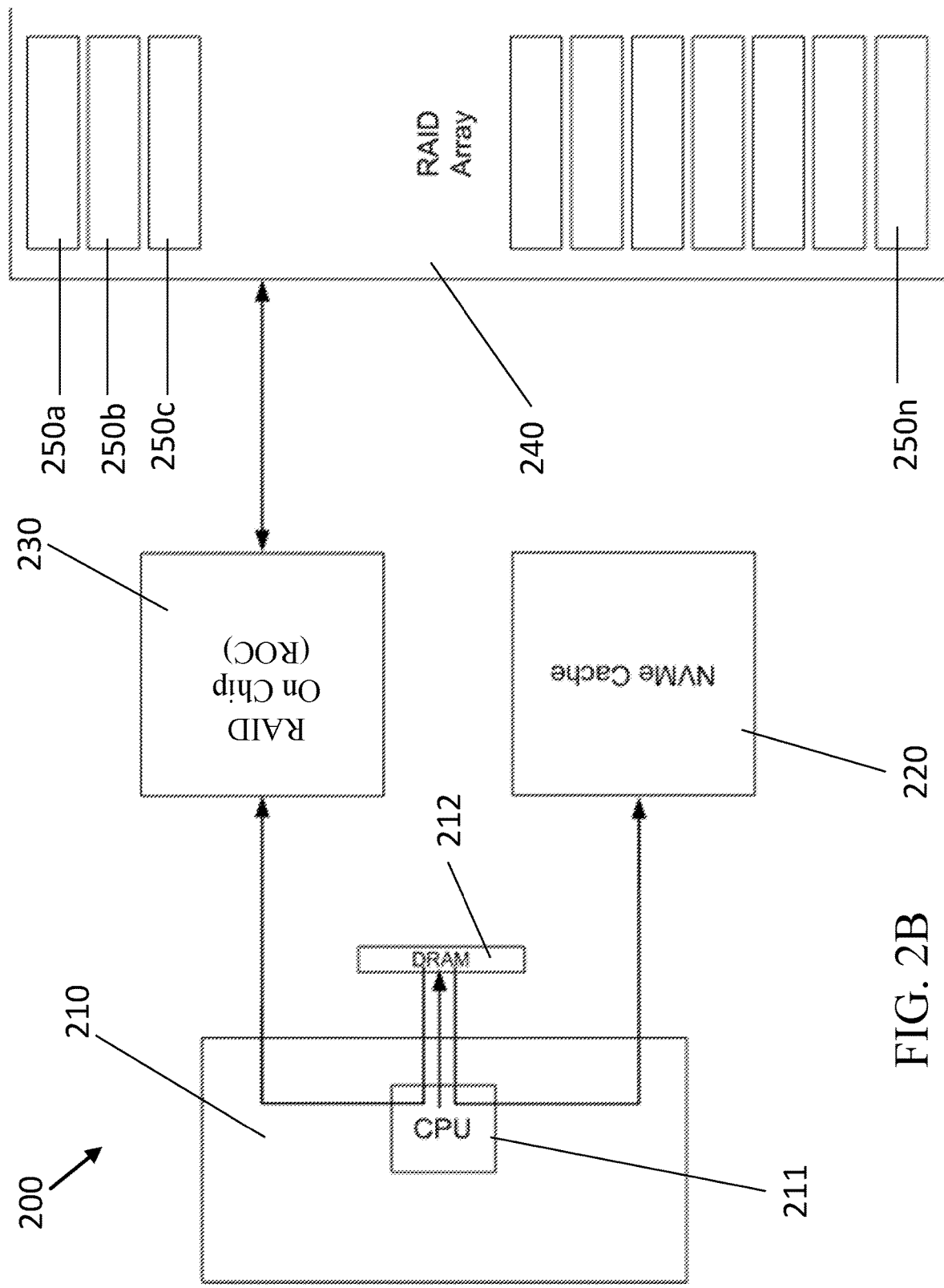
FIG. 2B illustrates an exemplary block diagram of a server system writing two copies of the same data to the two different targets, that is, the ROC and the NVMe drive/cache, which duplicates some resources and computational power and adds latencies since the transactions need to be staged in a serial manner

As shown in FIG. 2B, writing two copies of the same data to the two different targets, that is, the ROC 230 and the NVMe drive/cache 220, duplicates some resources and computational power and adds latencies since the transactions need to be staged in a serial manner That is, first, the CPU 211 writes the data to the system memory 212 and then both the NVMe drive/cache 220 and the ROC 230 need to set up their respective direct memory access (DMA) engine to read the data from the same memory location on the server's system memory (DRAM) 212 in order to guarantee consistency of the data. In a typical scenario, the data are written first to the NVMe drive/cache 220 and then a copy is written to the ROC 230 for further de-staging to the RAID drives 250*a-n*. Given the electromechanical latencies of the hard disk drives 250*a-n*, the latency overhead is, however, almost negligible.

Figure 2C:
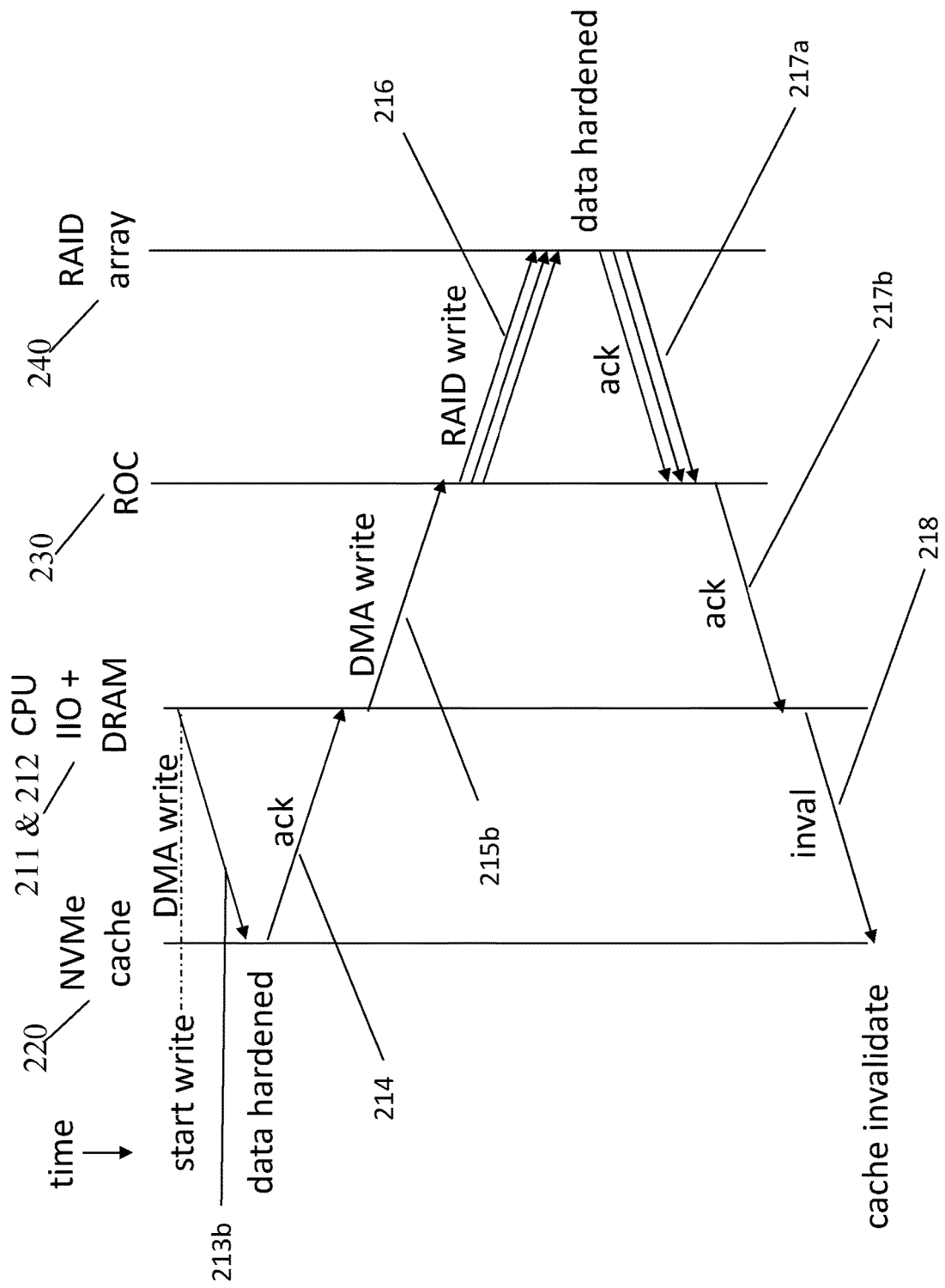
FIG. 2C illustrates an exemplary diagram of a sequence of events for the system of FIG. 2B starting with a direct memory access write by a CPU including its integrated IO complex (IIO) to an NVMe cache.

FIG. 2C shows the sequence of events for the system of FIG. 2B starting with a direct memory access write by the CPU including its integrated IO complex (IIO) also referred to as PCIe Root Complex to the NVMe cache. After the data are hardened the NVMe cache sends an acknowledge signal 214 to the CPU which then issues a request to the ROC to start the DMA write 215*b* to the ROC. Note that the CPU may not need to wait for the NVMe acknowledgement signal 214 to initiate the DMA write 215b to the ROC. Rather, it can start the process after the DMA engine of the NVMe cache relinquishes the memory bus. The ROC writes 216 the data to the RAID array and as soon as the data are hardened on the hard disk drives, the disk drives return 117a an acknowledge signal to the ROC which forwards 117b the acknowledge signal to the CPU. The CPU, in turn, issues an invalidate signal 218 to the NVMe cache, thereby indicating that such data are already stored in the RAID array 240 and can be cleared or overwritten in the NVMe cache 220.

Figure 2D:
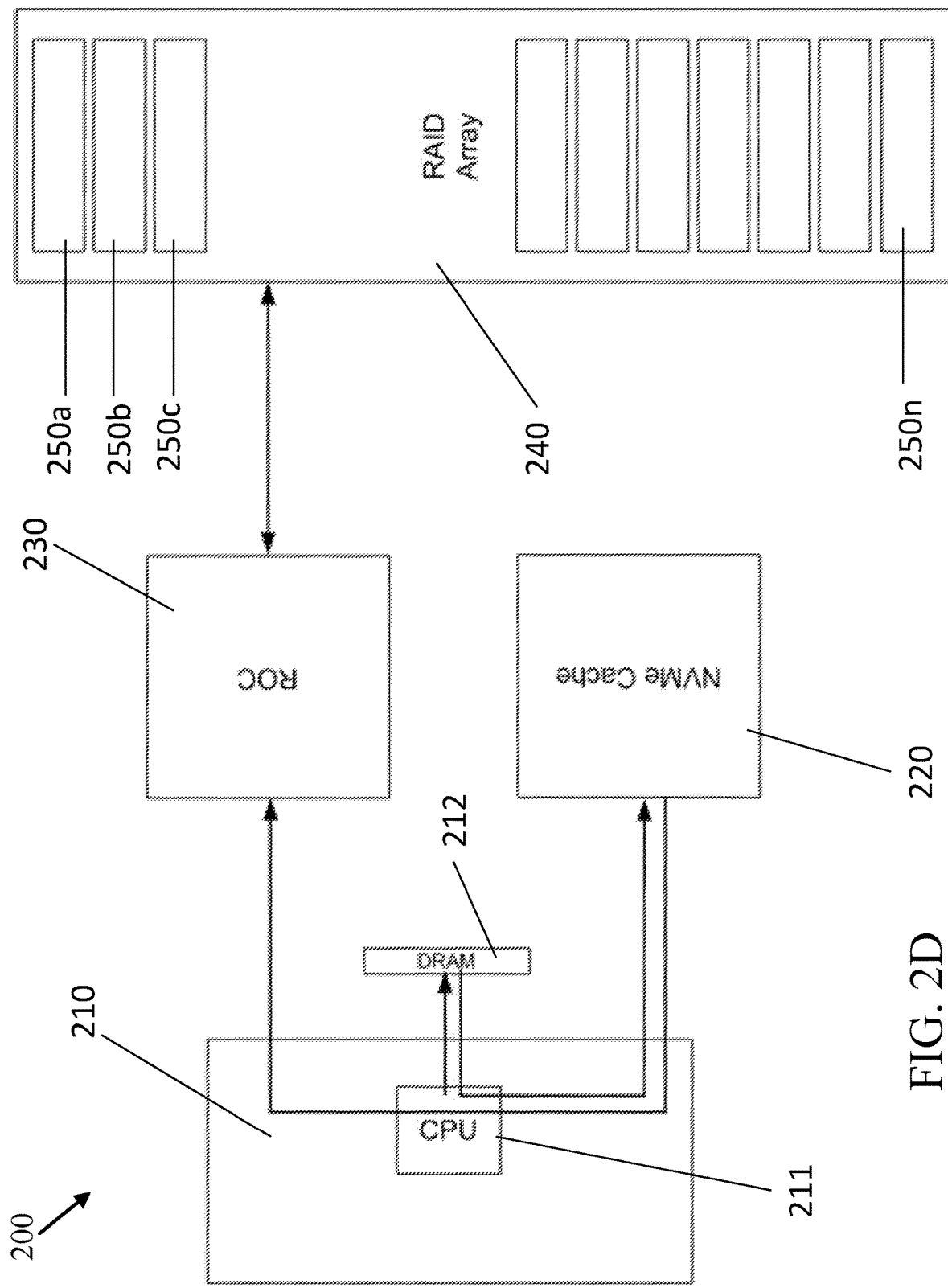
FIG. 2D illustrates an exemplary block diagram of a server system with a streamlined approach to accomplish copying of data to both a non-volatile memory (NVMe) drive and a RAID-on-chip (ROC).

FIG. 2D illustrates an exemplary block diagram of a server system with a streamlined approach to accomplish copying of data to both a non-volatile memory (NVMe) drive and a RAID-on-chip (ROC). In this implementation, data are written to the NVME drive/cache 220 only for the initial storing of the data set. A peer to peer transfer is then initiated between the NVMe drive/cache 220 and the ROC 230 using the server's PCIe root complex (e.g., implemented through the CPU 211) as a switch and using Address Translation Service (ATS) but without re-accessing the server's system memory 212. The initial transfer of the data to the NVMe drive/cache 220 may be initiated by the CPU 211 or else use DMA from another device, such as a network controller, to the system memory 212 first, then followed by another DMA transfer to the NVMe drive/cache 220.

Figure 2E:
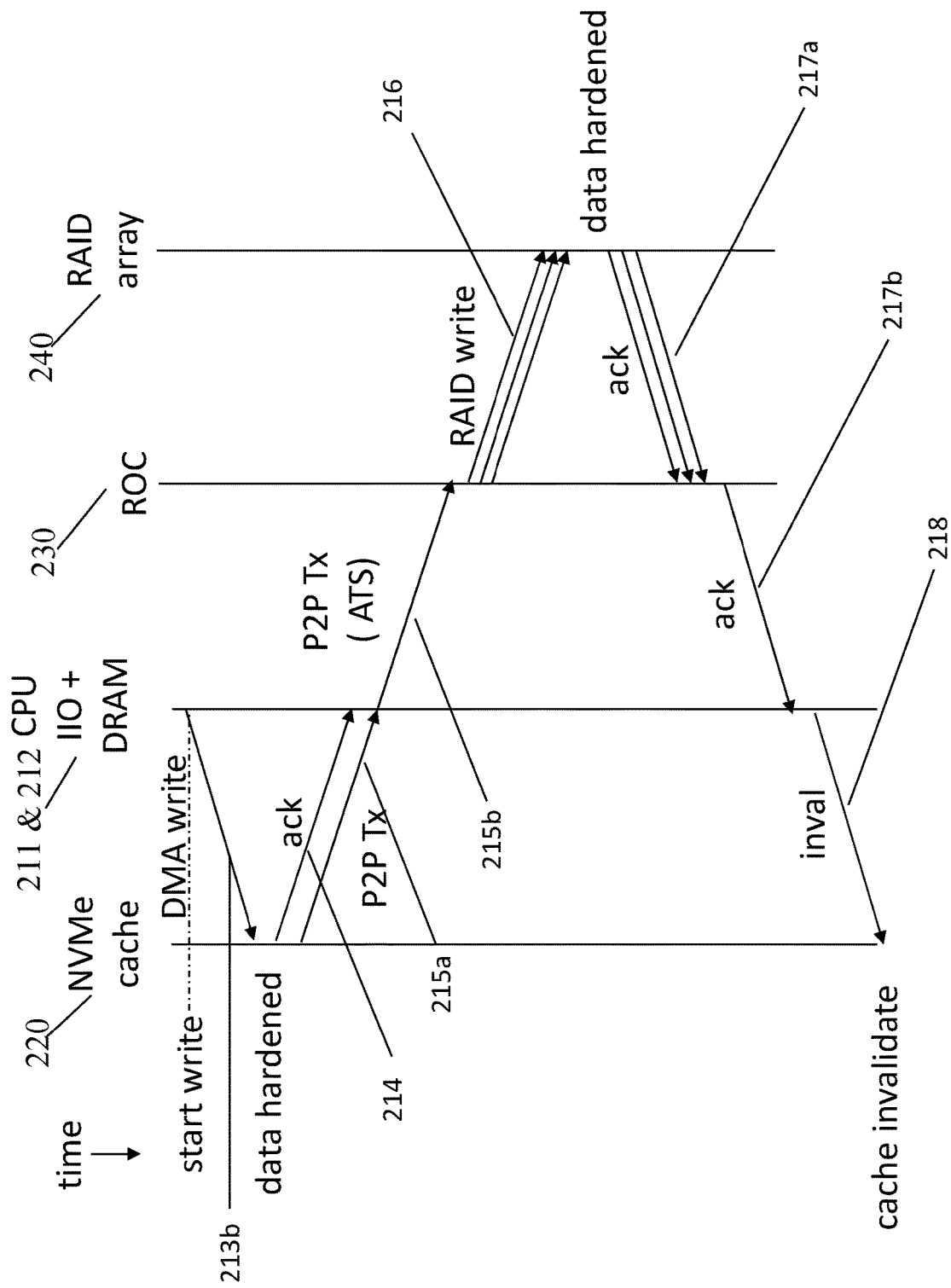
FIG. 2E illustrates an exemplary diagram of a sequence of events for a mode of action depicted in FIG. 2D.

FIG. 2E illustrates an exemplary diagram of a sequence of events for a mode of action depicted in FIG. 2D. The CPU and its file system may request a DMA write 213b to the NVMe drive/cache 220. The NVMe drive/cache 220 then commits the data to the non-volatile storage media, i.e. RAID array 240, (data hardened) and subsequently issues an acknowledge signal followed by a peer to peer transfer (P2P Tx) 215a of the data to the CPU's PCIe root complex (IIO) from where the data are forwarded using an ATS-based peer to peer transfer (P2P TX) 215b based on PCIe packet forwarding to the ROC 230. The ROC 230 computes the strip blocks and parity information and executes the RAID write 216 to the RAID array 240. When the data are hardened, the drives comprising the RAID array may issue an acknowledge signal 217a to the ROC 230 which relays the acknowledge signal 217b to the CPU 211 which then issues an invalidate signal 218 for the cached data to the NVMe cache 220.

In another aspect, the peer to peer transfer mode can also be used to restore data after a power fail or other system fault. Instead of reading the valid copy of the data from the NVMe drive/cache 220 into the system memory 212 and then writing the data back out to the ROC 230, a peer to peer transfer may be initiated to copy the data directly from the NVMe drive/cache 220 through the PCIe root complex to the ROC 230 from where it is de-staged to the HDDs 250a-n in the RAID array 240.

Figure 2F:
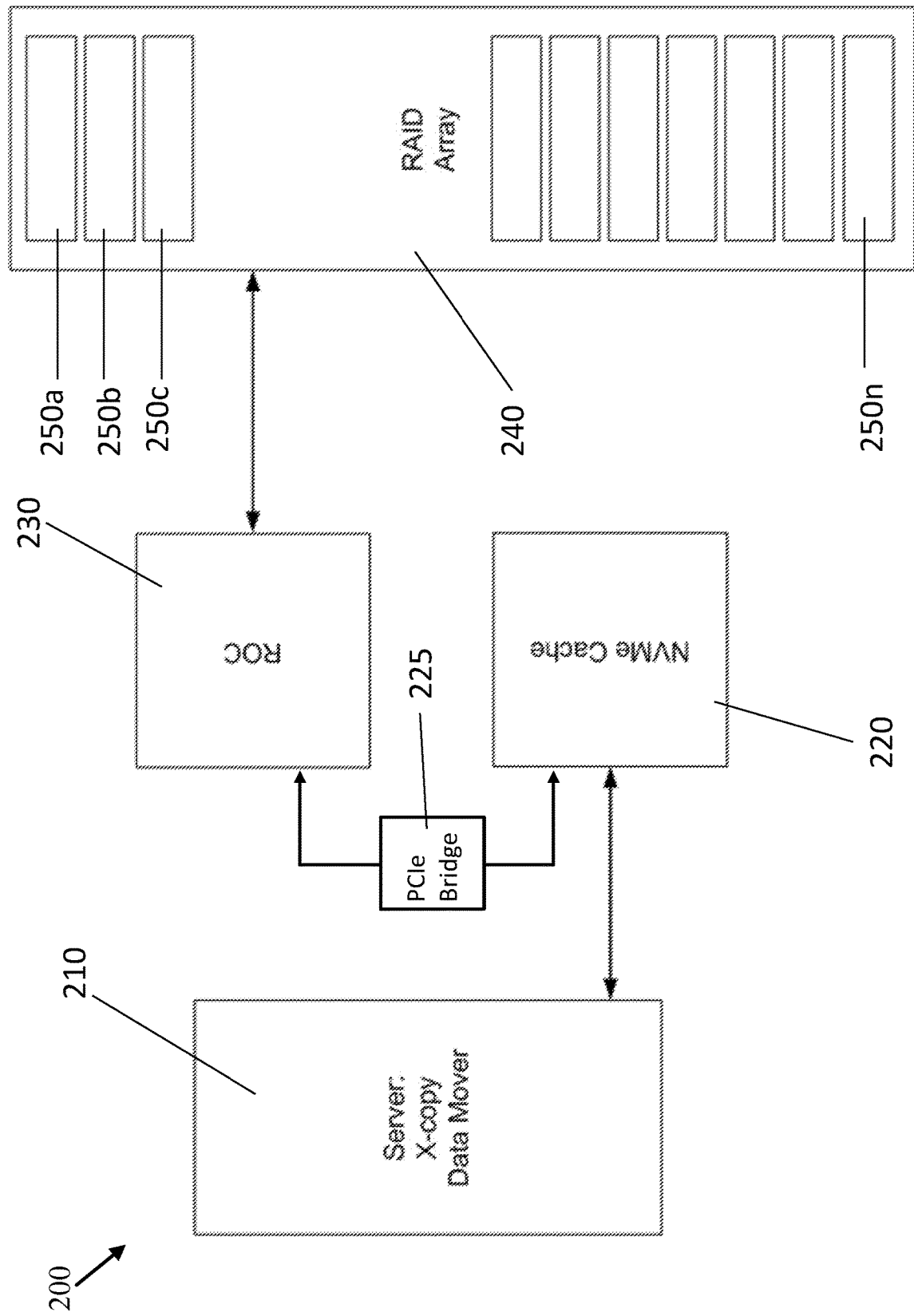
FIG. 2F illustrates an exemplary block diagram of a server system in which data are written as a single instance to a non-volatile memory (NVMe) drive and then forwarded through a PCIe bridge to a RAID on Chip (ROC).

FIG. 2F illustrates another exemplary block diagram of a server system in which data are written as a single instance to a non-volatile memory (NVMe) drive/cache and then forwarded through a separate/distinct PCIe bridge 225 to a RAID on Chip (ROC) 230. The data may be forwarded by the NVMe) drive/cache 220 through a PCIe bridge 225 to the ROC 230 using Access Control Services (ACS) packet forwarding, IO virtualization through single root IO virtualization (SRIOV) or any other suitable protocol. The PCIe bridge 225 may be a switch or a non transparent bridge (NTB) between the NVMe drive/cache 220 and the ROC 230. The NVMe drive/cache 220 may be dual ported with one port connected to the host and the other port connected to the bridge 225. The bridge 225 may a discrete integrated circuit or else be a logical function of the NVMe drive controller or the ROC.

Figure 2G:
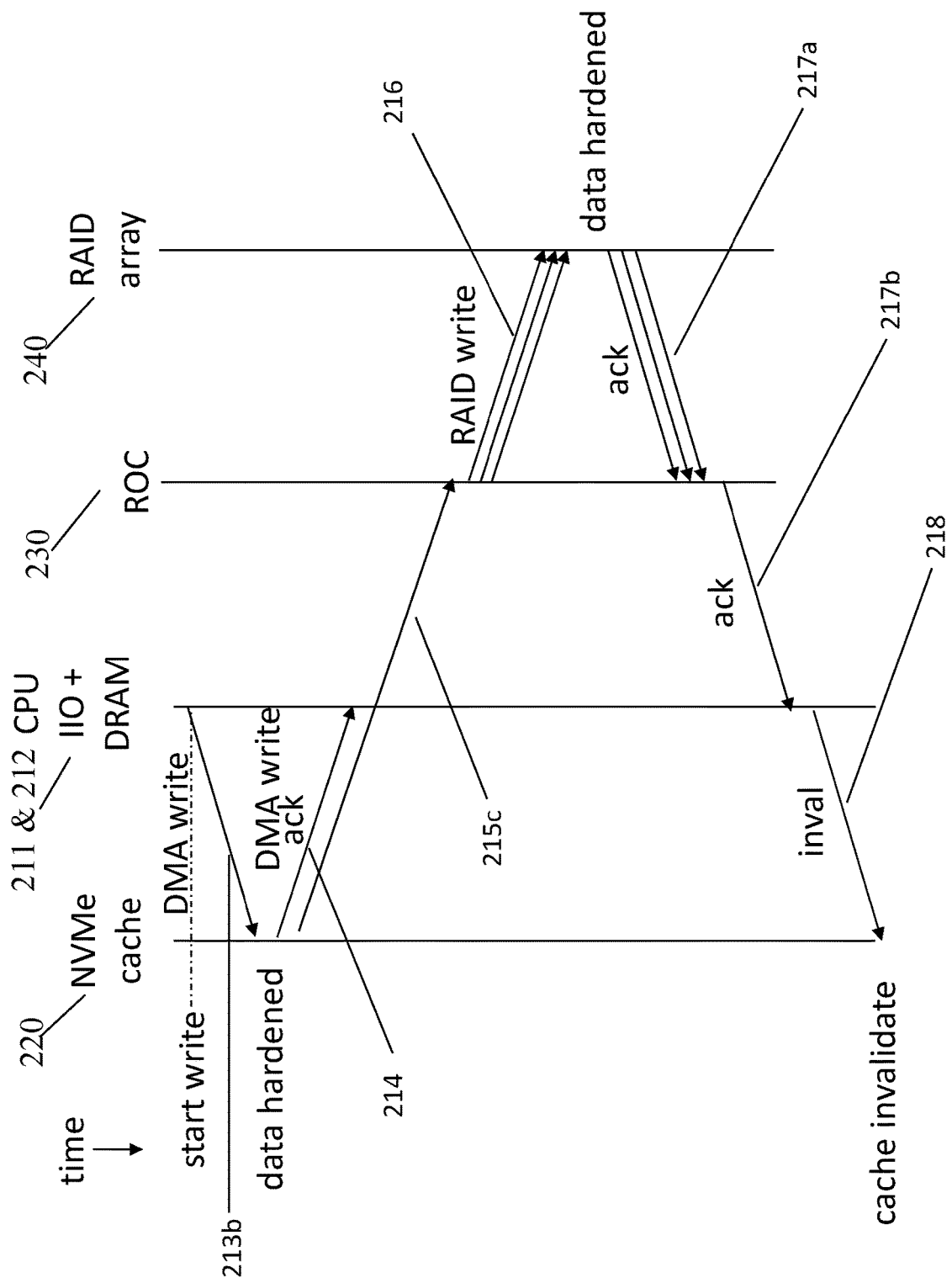
FIG. 2G illustrates an exemplary diagram of a sequence of events for a mode of action depicted in FIG. 2F.

FIG. 2G illustrates the timing sequence of the mode of action depicted in FIG. 2F. The CPU and its file system request a DMA write 213b to the NVMe drive. The NVMe drive commits the data to the non-volatile storage media (data hardened) and subsequently issues an acknowledge signal followed by a peer to peer transfer (P2P Tx) 215c of the data to the ROC using access control services (ACS)-based packet forwarding. The ROC computes the stripe blocks and parity information and executes the RAID write 216 to the RAID array. When the data are hardened, the drives comprising the RAID array issue an acknowledge signal 217a to the ROC which relays the acknowledge signal 217b to the CPU which then issues an invalidate signal 218 for the cached data to the NVMe cache.

Figure 3:
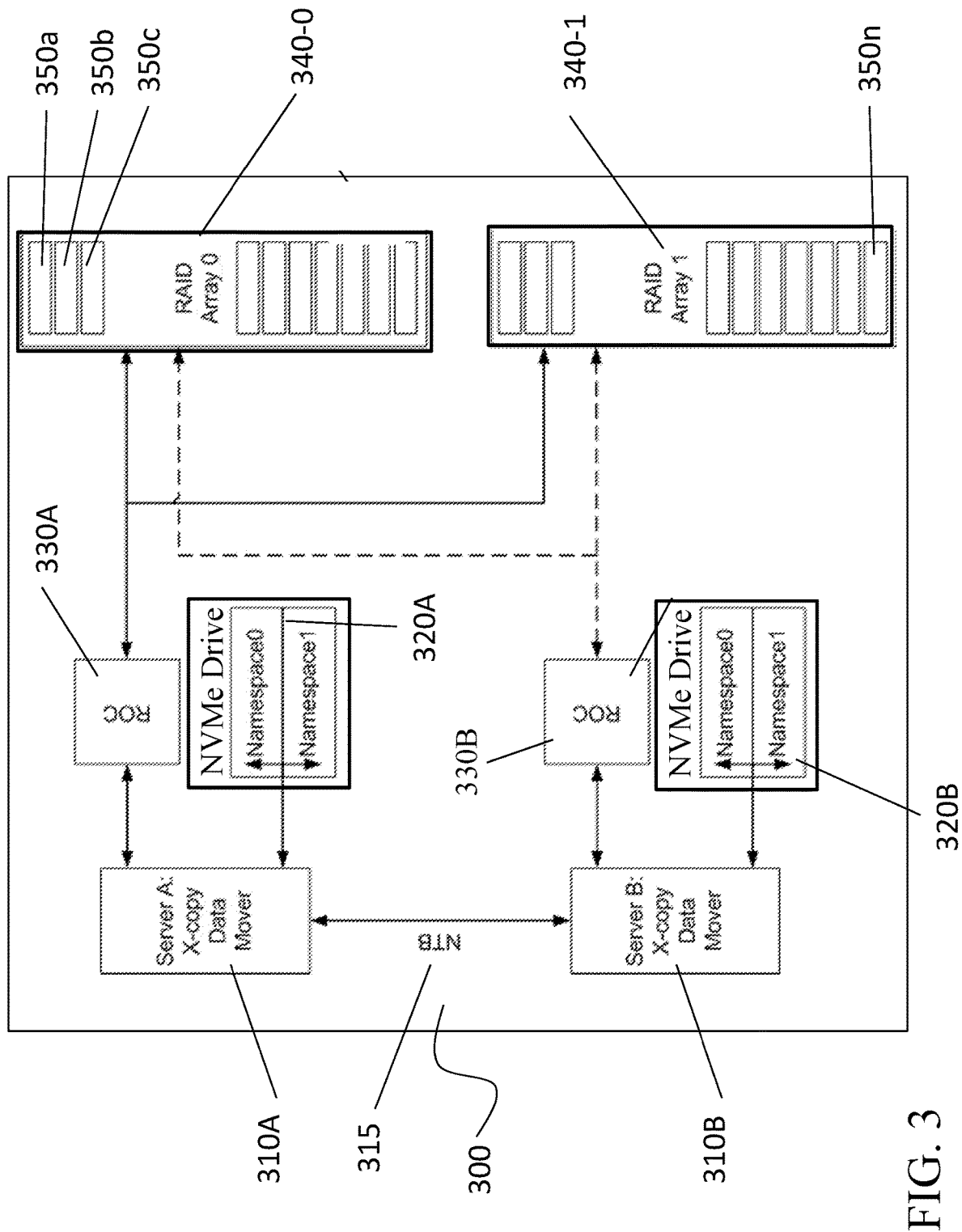
FIG. 3 illustrates a high availability server configuration having two servers (Server A and Server B) with a write cache drive each as the front end of two RAID groups.

FIG. 3 illustrates a high availability server configuration having two servers (Server A 310A and Server B 310B) with a write cache drive 320A, 320B each as the front end of two RAID groups 340-0, 340-1. The two servers are mirrored through a non-transparent bridge (NTB) 315 between their CPUs. The RAID arrays (RAID Array 0 340-0 and RAID Array 1 340-1) are using dual-ported SAS drives 350a-n having an A port and a B port accessible by Server A or Server B, respectively. The use model may be application-specific, for example when running one application, only Server A may store data on the RAID array, whereas another application running on Server B may also store data on the same RAID array. Either server sends the data to the local ROC 330A or 330B, which creates the stripe blocks along with the distributed parity block and then accesses the drives 350a-n through one of the SAS ports. Server A may access the drives through the A port, whereas server B may access the drives through the B port.

A copy of the data sent from Server A 310A to the ROC 330A may be stored on a dedicated namespace (Namespace0) of a first NVMe drive 320A. The first NVMe 320A drive may be direct-attached to Server A 310A or be part of an NVMe appliance or else be functionally connected to Server A, thereby functioning as a local NVMe drive, and using any suitable protocol, including but not limited to Ethernet, FibreChannel, PCIe over Network or InfiniBand. The first NVMe drive 320A may further have a second namespace "Namespace1" reserved for use by the remote Server B 310B, that is set up to receive of data through an indirect connection to the remote Server B 310B. The indirect connection may be routed through the same data link to Server A 310A which is then connected through the non-transparent bridge (NTB) to Server B 310B. Likewise, Server B 310B is connected to a second NVMe drive 320B with two namespaces (Namespace0 and Namespace1), wherein Namespace1 is reserved to receive data from Server B 310B in, whereas data from Server A 310A are routed through the NTB to server B and then to Namespace0.

In case of a power loss where the data were written to one of the ROCs (330a, 330B) but lost before they were committed to the non-volatile storage media of the drives 350a-n), the data can be restored by retrieving the copy of the data written to the dedicated namespace on the NVMe drives 320a, 320B. After reading the data from the NVMe drives into the server's 310A, 310B system memory, the data can then be written again to the ROC 330A, 330B, striped and written with distributed parity to the RAID array 340-0, 340-1 to complete the transaction interrupted by the fault.

The data writes to both NVMe drives are transactional, that is, both NVMe drives 320A, 320B receive the same data substantially at the same time (discounting the added latency caused by the NTB hop). Consequently, it suffices to access the "local" or "near" NVMe drive by either server to retrieve either data set written by any of the highly-available servers instead of accessing the "remote" or "far" NVMe drive. Local or near vs. remote or far in this context can also mean the shortest overall access time which may reflect the specific processor load and access demand.

The NVMe drive is acting as a cache for the back-end storage and therefore, the write load equals the aggregate write load of all back end devices. In most cases, the data are written to the drive, followed by a second write of the data to the ROC. As soon as the ROC acknowledges that all data have been successfully hardened to the HDDs on the back end, it is no longer necessary to maintain a copy of the data on the NVMe drive and the data may be purged. In the case of NAND flash-based storage devices, the purging of the data is done by invalidating the pointers to the actual data locations and the flash memory cells are recycled during subsequent idle periods through garbage collection and proactive block erase cycles. However, flash has very limited write endurance, that is, a finite number of program/erase cycles before the cells wear out. Other non-volatile memory technologies may be, therefore, more suitable for the type of write cache described here.

Of particular interest are Spin-Transfer Torque MRAM (STT-MRAM), Spin-Orbit Torque MRAM (SOT-MRAM) and 3D Cross Point Memory (3DXP memory) which offer high write endurance at fast programming speed. Since data can be purged as soon as a valid copy has been committed to the back-end storage media, there is no need for high capacity and the drive can be configured as a circular buffer as long as the write endurance permits such mode of operation. This makes STT-MRAM, SOT-MRAM and 3DXP memory ideally suited candidates for such a device but other memory technologies need to be considered as well.

Figure 4:
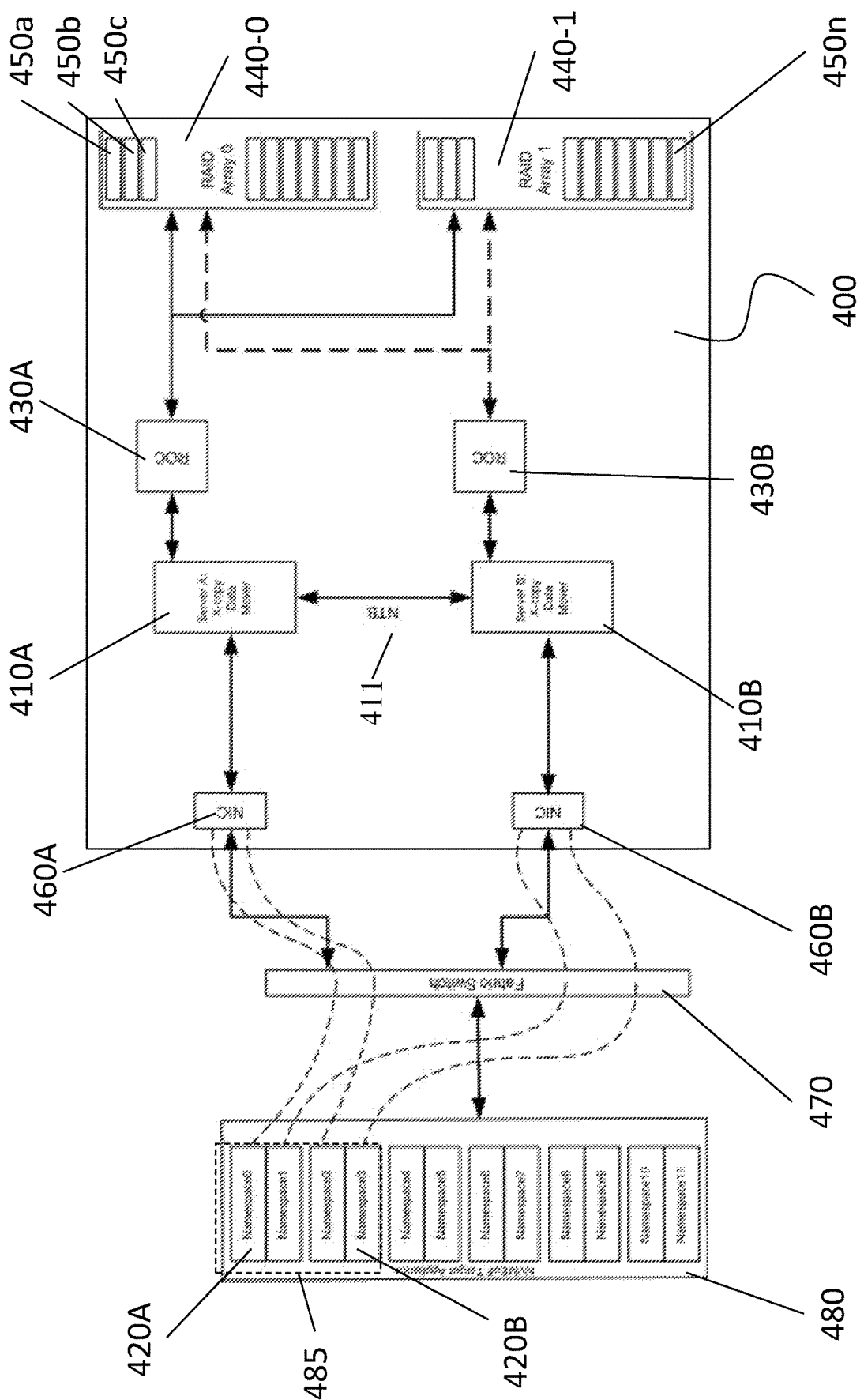
FIG. 4 illustrates a plurality of disaggregated cache drives as part of a non-volatile memory (NVMe) over Fabric (NVMeoF) target appliance serving as a "journal repository" for a plurality of RAID groups in one or several locations.

FIG. 4 illustrates a plurality of disaggregated cache drives as part of a non-volatile memory (NVMe) over Fabric (NVMeoF) target appliance serving as a "journal repository" for a plurality of RAID groups in one or several locations. A high availability server computer system 400 may have two server computers 410A, 410B that may be in a common enclosure or configured as physically separate entities. The server computer may be x86-based, ARM-based or an FPGA design with minimal compute capabilities. Each server writes at least one copy of the data to two NVMe drives while the data are written substantially in parallel to a RAID group 440-0, 440-1 of HDDs 450a-n. In greater detail, the data are written from the server 410A to the network interface controller (NIC) 460A, followed by a copy of the data being written to the RAID-On-Chip (ROC) controller 430A. The RAID controller 430A can access both RAID arrays 440-0 and 440-1.

The NIC 460A is connected through a network protocol or any suitable fabric protocol to a fabric switch 470 which in turn is connected to an NVMe over Fabric (NVMeoF) target appliance 480 having a plurality of NVMe drives 420A, 420B that may be mirroring each other in a RAID-1 array 485. Each NVMe drive has at least two namespaces shown here as a non limiting example with odd versus even namespace numbers assigned to servers 410A and 410B, respectively.

Figure 5:
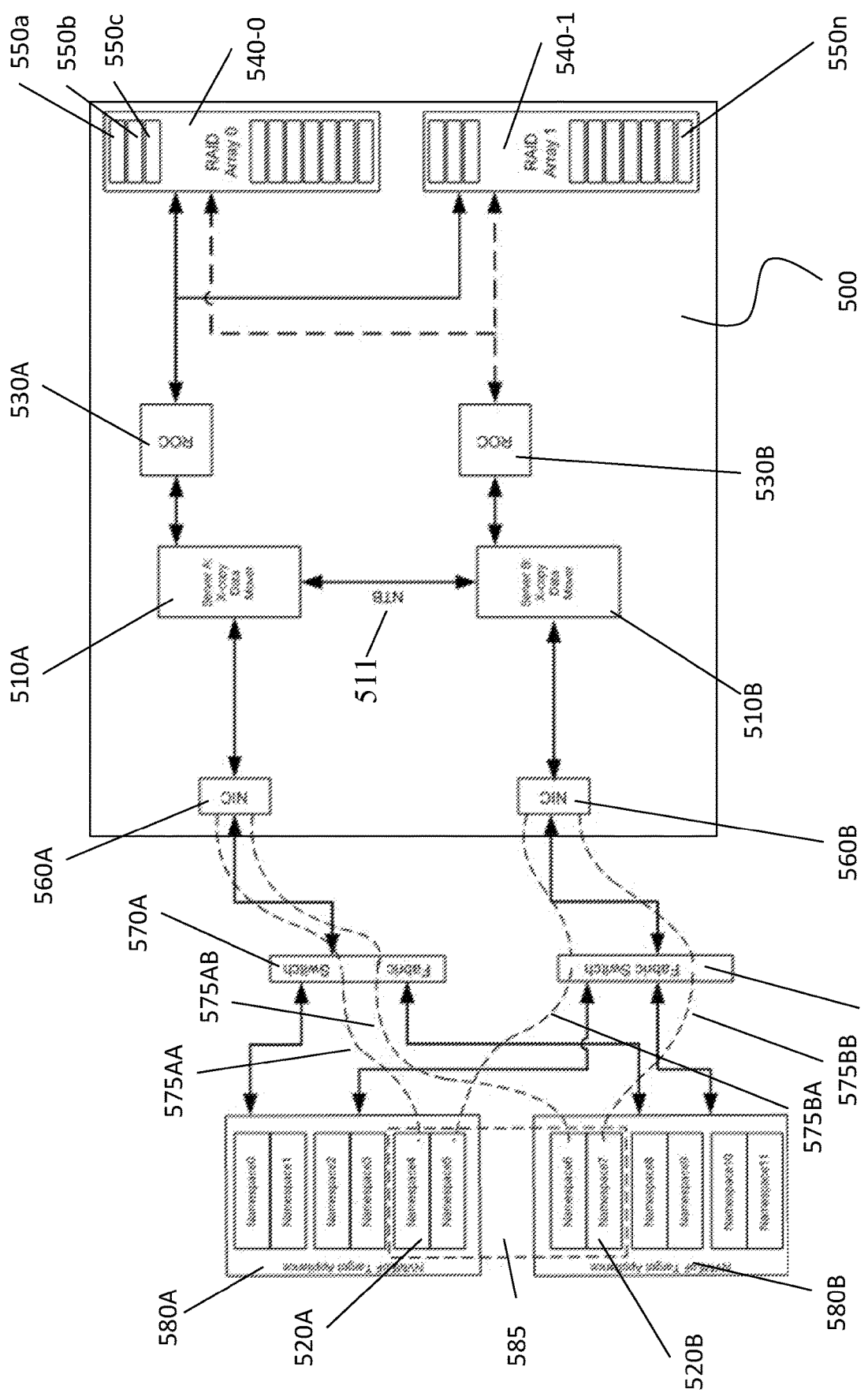
FIG. 5 illustrates a block diagram including a system having two disaggregated cache drives accessed over two different fabric switches and non-volatile memory over fabric (NVMeoF) appliances for physical separation and increased fault tolerance against local failure events with distributed mirroring of the NVMe name spaces.

Following the data transactions to the ROC and the NIC, the server 410A forwards a third copy of the data to the fail-over server 410B (or vice versa) via the non transparent bridge (NTB). The fail-over server 410B then repeats the data transfers to the ROC 430A and the RAID Arrays as well as the NIC 430B and the NVMeoF appliance via the Fabric Switch 470. The data are stored on the NVMe drives in the odd numbered namespaces. If server A 410A stores the block of "local" data on namespace0, server B 410B may store a copy of the same data received via the NTB 411 in namespace3. Likewise, server B 410B may store a block of "local" data on namespace1 of NVMe drive 420A and communicate a copy of the data via the NTB 411 to server A 410A to initiate storing of the data on namespace2 of drive 420B. This particular affinitizing of namespaces provides redundancy against single point failure of either NVMe drive 420 A or 420 B but different affinitizing schemes are possible FIG. 5 illustrates a block diagram including a system having two disaggregated cache drives accessed over two different fabric switches and non-volatile memory over fabric (NVMeoF) appliances for physical separation and increased fault tolerance against local failure events with distributed mirroring of the NVMe name spaces. Two servers 510A and 510B are connected via the non-transparent bridge (NTB) 511 and each server has its own ROC 530A, 530B to create a RAID array 540-0, 540-1 containing hard disk drives 550a-n. Each server also has its own NIC 560A, 560B which is connected to a fabric switch 570A, 570B. Each fabric switch 570A, 570B is connected to an NVMeoF target appliance 580A and 580B containing NVMe drives 520A and 520B, respectively as a minimum and wherein each NVMe drive has at least two namespaces. Two or more NVMe drives containing mirrored data may form a mirror array 585 spanning across separate NVMeoF appliances 580A and 580B, the data path 575AA, 575AB. 575BA, 575BB from each fabric switch to each NVMeoF appliance is shown using the first moniker A,B to designate the origin (switch—server) and a second moniker A,B to designate the NVMeof target appliance.

Figure 6:
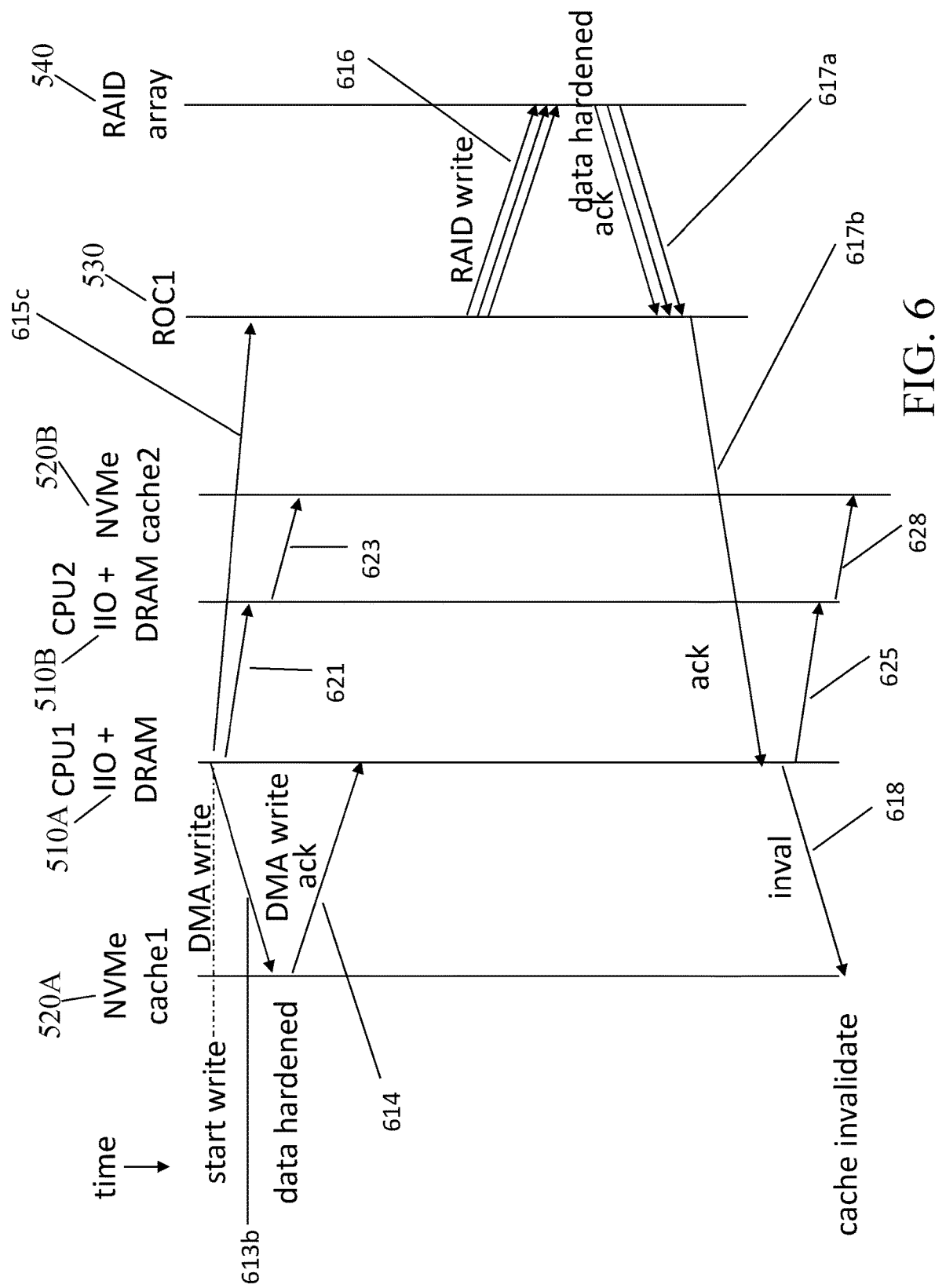
FIG. 6 illustrates an exemplary diagram of a sequence of events for write caching in the system of FIG. 5.

FIG. 6 illustrates an exemplary diagram of a sequence of events for write caching in the system of FIG. 5. Server 1 initiates a DMA write 613b to NVMe cache 1 (located in NVMeoF appliance 580A of FIG. 5) and immediately thereafter a write 615c to ROC1 (FIG. 5: 530A) followed by a write 621 of the same data to CPU2 on the second server (FIG. 5: 510B) via the NTB 511. The second server writes 623 the data to the NVMe cache2. ROC1 writes 616 the data to the RAID array, which acknowledges 617a hardening of the data to ROC1, which acknowledges hardening 617b to CPU1. CPU1 issues an invalidate signal 618 to the NVMe cache1 and forwards a copy of the invalidate signal 625 via the NTB to CPU2 on server 2. CPU2 then issues an invalidate signal 628 to NVMe cache2.

The same process may be initiated on server2 to the complementary targets on server2 and server1.

Figure 7:
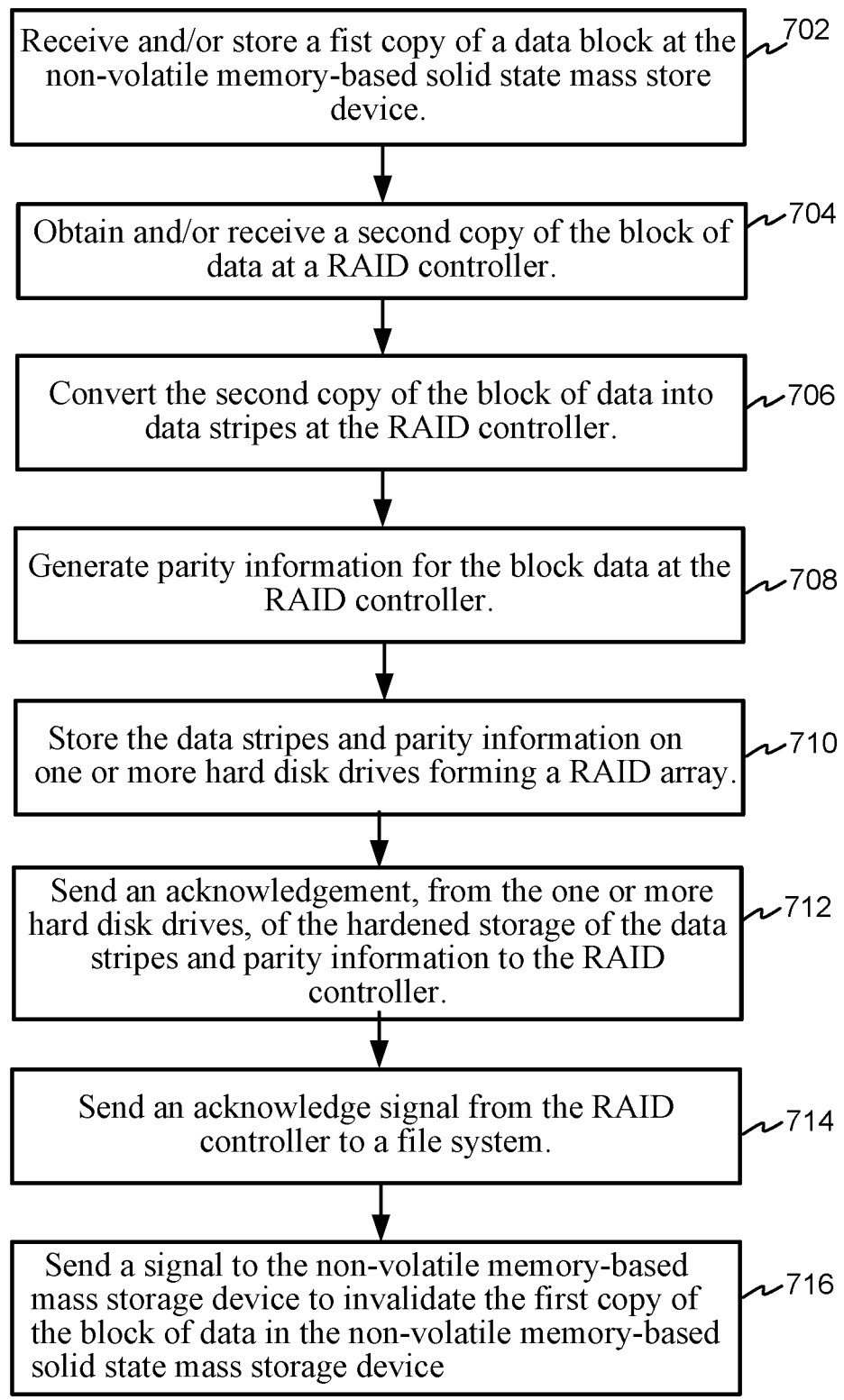
FIG. 7 illustrates an exemplary method that may be executed by a server including a RAID controller and a non-volatile memory-based solid state mass store device.

FIG. 7 illustrates an exemplary method that may be executed by a server including a RAID controller and a non-volatile memory-based solid state mass store device. A first copy of a block of data may be received and/or stored at the non-volatile memory-based solid state mass store device 702. The RAID controller may obtain or receive a second copy of the block of data 704. The RAID controller may then convert the second copy of the block of data into data stripes 706. Parity information may also be generated for the block data at the RAID controller 708. The data stripes and parity information may then be stored on one or more hard disk drives forming a RAID array 710. The hard disk drives may acknowledge the hardened storage of the data stripes and parity information to the RAID controller 712. Upon receipt of the acknowledge from the hard disk drives, the RAID controller may send an acknowledge signal to a file system 714. The file system may send a signal to the non-volatile memory-based mass storage device to invalidate the first copy of the block of data in the non-volatile memory-based solid state mass storage device 716.

Figure 8A:
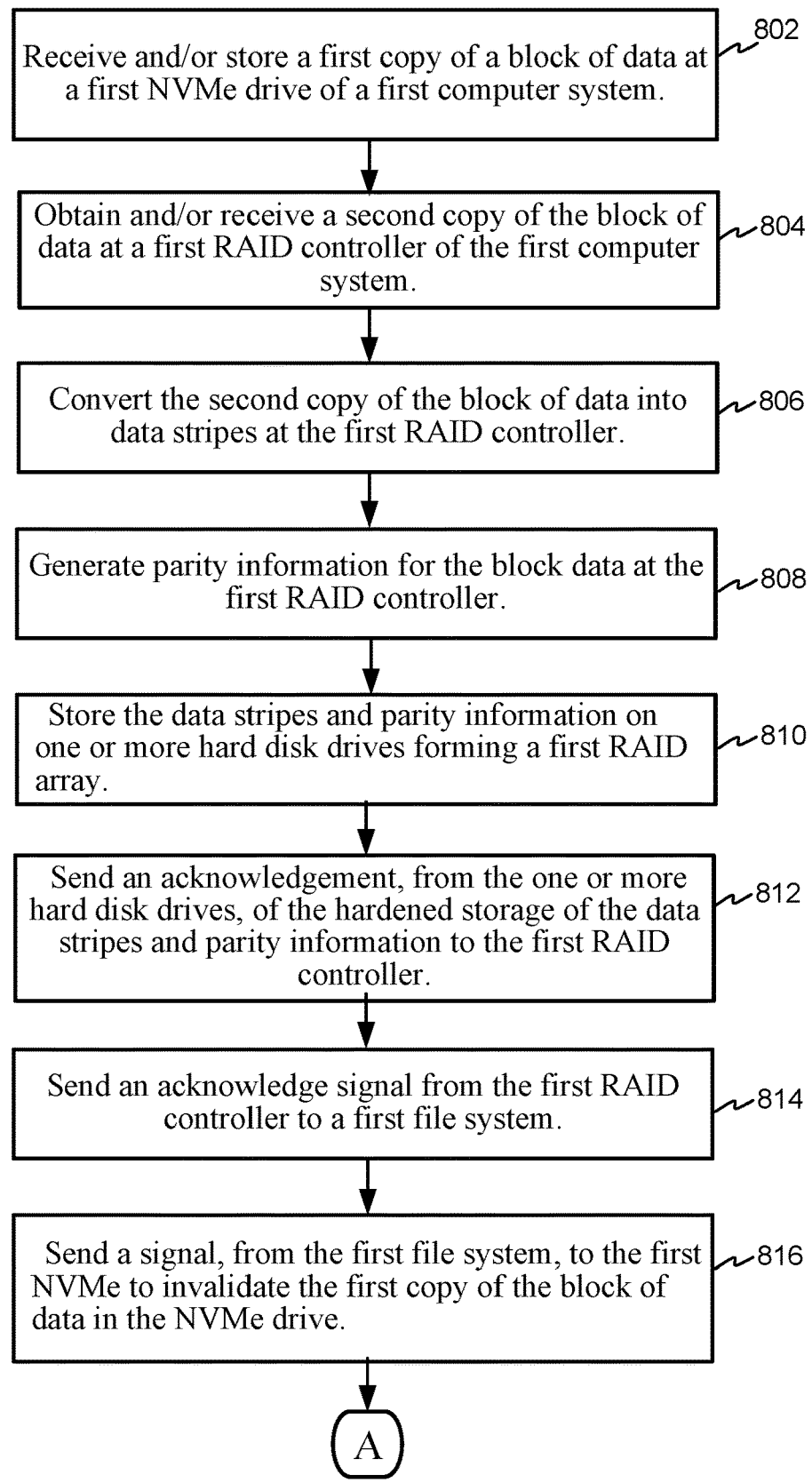
FIG. 8 (comprising FIGS. 8A and 8B) illustrates an exemplary method that may be executed by a high availability data storage system including a first computer system and a second computer system.
Figure 8B:
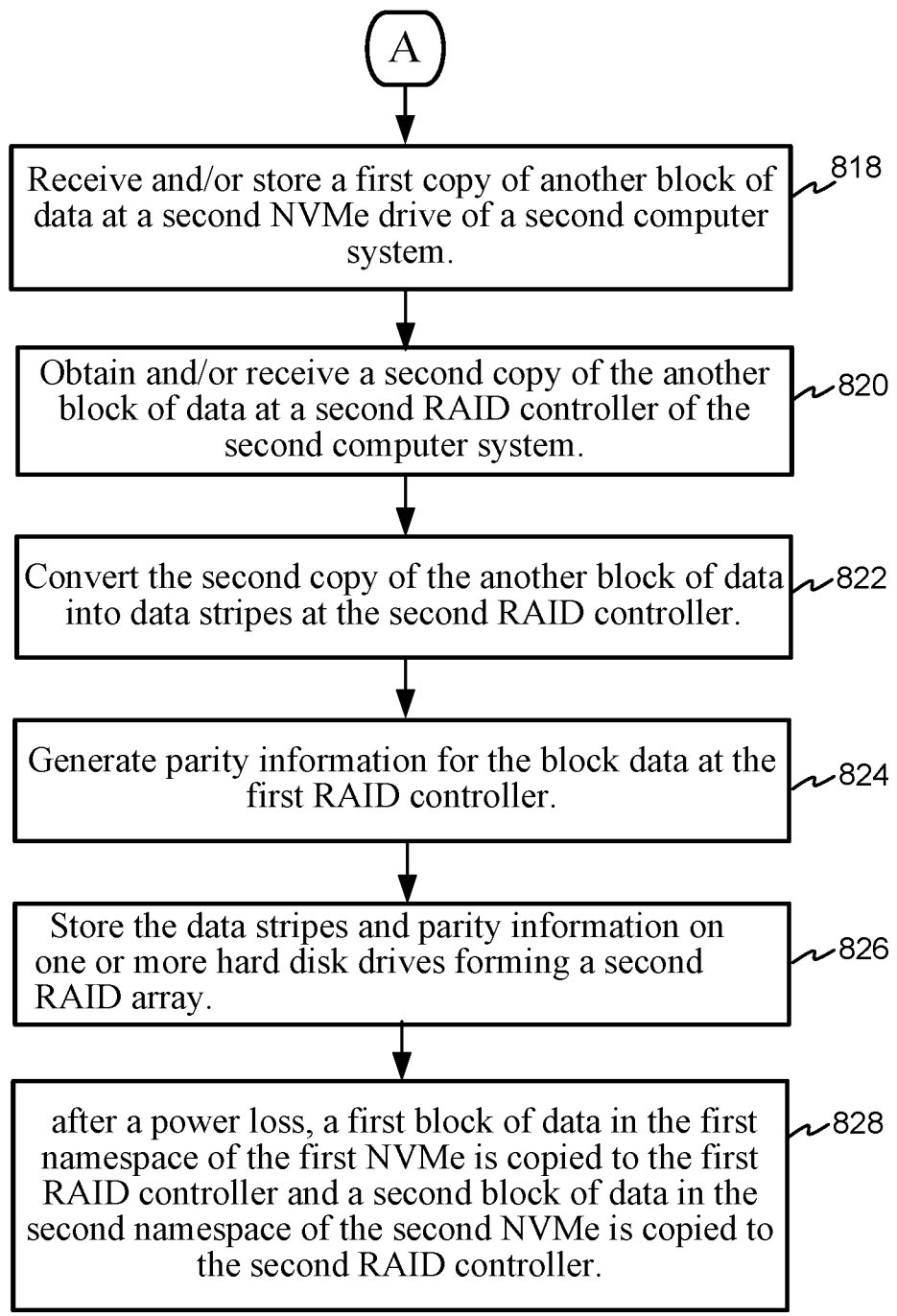

FIG. 8 (comprising FIGS. 8A and 8B) illustrates an exemplary method that may be executed by a high availability data storage system including a first computer system and a second computer system. The first computer system may include a first CPU, a first system memory, a first redundant array of independent disks (RAID) controller coupled to the first CPU and to a plurality of hard disk drives forming a first RAID array, and a first non-volatile memory express (NVMe) drive coupled to the first CPU, the first computer system using a first file system. The second computer system may include a second CPU, a second system memory, a second redundant array of independent disks (RAID) controller coupled to the second CPU and to a plurality of hard disk drives forming a second RAID array, and a second NVMe drive coupled to the second CPU, the second computer system using a second file system, wherein the first computer system coupled to the second computer system.

A first copy of a block of data is received and/or stored at the first NVMe drive of the first computer system 802. A second copy of the block of data is obtained or received at the first RAID controller 804. The second copy of the block of data may then be converted, by the first RAID controller, into data stripes 806. Parity information may be generated, by the first RAID controller, for the data stripes 808. The data stripes and parity information may be stored, by the first RAID controller, on the hard disk drives forming the first RAID array 810. Upon the hard disk drives of the first RAID array acknowledging the hardened data stripes and parity information to the first RAID controller 812, the first RAID controller sends an acknowledge signal to the first file system 814. The first file system may then send a signal to the first NVMe drive to invalidate the first copy of the block of data in the first NVMe drive 816. The data written to a first namespace on the first NVMe drive may be copied through a non-transparent bridge between the first CPU and the second CPU and written to a first namespace on the second NVMe drive.

A first copy of another block of data may be received and/or stored at the second NVMe drive of the second computer system 818. A second copy of the another block of data is obtained or received at the second RAID controller 820. The second copy of the another block of data may then be converted, by the second RAID controller, into data stripes 822. Parity information may be generated, by the second RAID controller, for the data stripes 824. The data stripes and parity information may be stored, by the second RAID controller, on the one or more hard disk drives forming a second RAID array 826. Data written by the second CPU may be stored in a second namespace of the second NVMe drive, the data are then copied through the non-transparent bridge to the first CPU and written to a second namespace on the first NVMe drive. After a power loss, a first block of data in the first namespace of the first NVMe is copied to the first RAID controller and a second block of data in the second namespace of the second NVMe is copied to the second RAID controller 828.

Figure 9:
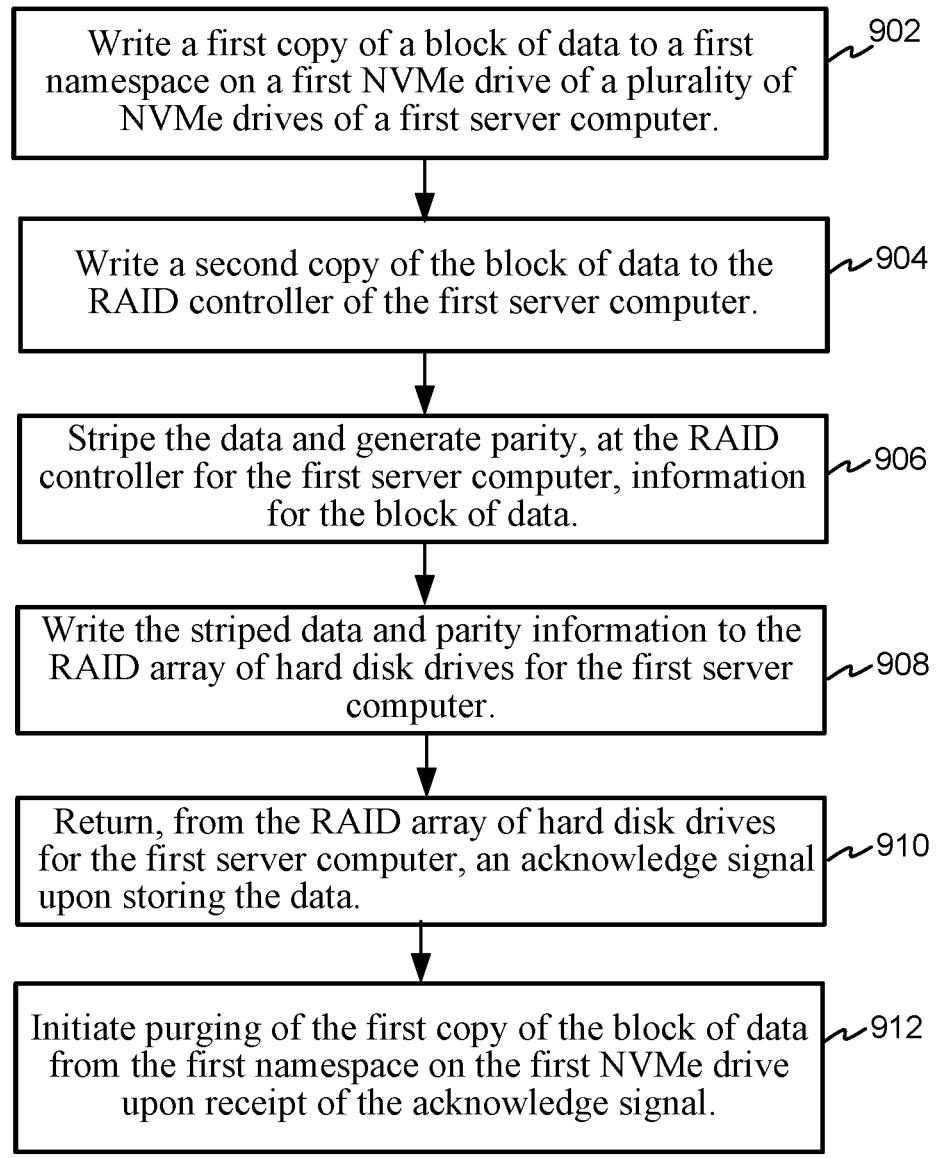
FIG. 9 illustrates an exemplary method that may be executed by a non-volatile memory-based cache appliance.

FIG. 9 illustrates an exemplary method that may be executed by a non-volatile memory-based cache appliance. The non-volatile memory-based cache appliance may include a plurality of non-volatile memory express (NMVe) drives, each NVMe drive defining at least one namespace. The non-volatile memory-based cache appliance may also include a fabric switch coupled to the plurality of NVMe drives, wherein the fabric switch is coupled between a first server computer and a second server computer, each of the first and second server computers including a central processing unit (CPU), a system memory, and a redundant array of independent disks (RAID) controller coupled to a RAID array of hard disk drives. The first server computer may be configured to write a first copy of a block of data to a first namespace on a first NVMe drive of the plurality of NVMe drives 902, and write a second copy of the block of data to the RAID controller of the first server computer 904. The RAID controller for the first server computer may be configured to stripe the data and generate parity information for the block of data 906, and write the striped data and parity information to the RAID array of hard disk drives for the first server computer 908. The RAID array of hard disk drives for the first server computer return an acknowledge signal upon storing the data 910. The acknowledge signal is used to initiate purging of the first copy of the block of data from the first namespace on the first NVMe drive 912.

The CPUs of the first server computer and the second server computer may be communicatively coupled via a non-transparent bridge. A third copy of the block of data may be copied via the non-transparent bridge from the CPU of the first server computer to the CPU of the second server computer. The CPU of the second server computer writes a fourth copy of the block of data to a first namespace in a second NVMe drive from the plurality of NMVe drives.

The acknowledge signal may be communicated from the CPU of the first server computer to the CPU of the second server computer. The CPU of the second server computer may use the acknowledge signal received from the CPU of the first server computer to initiate a purging of data of the first namespace on the second NVMe drive.

While the invention has been described in form of specific and preferred embodiments and form factors, it is foreseeable that functionally equivalent designs could be used or subsequently developed to perform the intended functions of the disclosed retaining clip. Therefore, it is apparent that other forms could be adopted by one skilled in the art. Finally, while the appended claims recite certain aspects believed to be associated with the invention and investigations discussed above, they do not necessarily serve as limitations to the scope of the invention.

The invention claimed is:

1. A computer system, comprising:
   a server computer using a file system, the server computer including a central processing unit (CPU), a system memory, a redundant array of independent disks (RAID) controller coupled to the CPU and a plurality of hard disk drives forming a RAID array; and
   a non-volatile memory-based solid state mass storage device coupled to the CPU, wherein the non-volatile memory-based solid state mass storage device is configured to receive and store a first copy of a block of data, and
   wherein the RAID controller is configured to:
     obtain/receive a second copy of the block of data;
     convert the second copy of the block of data into data stripes;
     generate parity information for the block data;
     store the data stripes and parity information on the hard disk drives forming the RAID array;
     whereupon the hard disk drives acknowledge hardened storage of the data stripes and parity information to the RAID controller, the RAID controller sends an acknowledge signal to the file system, and the file system sends a signal to the non-volatile memory-based mass storage device to invalidate the first copy of the block of data in the non-volatile memory-based solid state mass storage device.

2. The computer system of claim 1, wherein the non-volatile memory-based mass storage device is a non-volatile memory express (NVMe) drive.

3. The computer system of claim 2, wherein the data are read by the NVMe drive and by the RAID controller from a same location in the system memory.

4. The computer system of claim 2, wherein the data are read by the NVMe drive from the system memory and then forwarded to the RAID controller using address translation services through a peripheral component interconnect express (PCIe) root complex of the CPU.

5. The computer system of claim 2, wherein the data are read by the NVMe drive from the system memory and then forwarded through a peripheral component interconnect express (PCIe) switch to the RAID controller using access control services.

6. A high availability data storage system, comprising:
a first computer system including a first CPU, a first system memory, a first redundant array of independent disks (RAID) controller coupled to the first CPU and to a plurality of hard disk drives forming a first RAID array, and a first non-volatile memory express (NVMe) drive coupled to the first CPU, the first computer system using a first file system;
a second computer system including a second CPU, a second system memory, a second redundant array of independent disks (RAID) controller coupled to the second CPU and to a plurality of hard disk drives forming a second RAID array, and a second NVMe drive coupled to the second CPU, the second computer system using a second file system, wherein the first computer system coupled to the second computer system;
wherein the first NVMe drive is configured to:
receive and store a first copy of a block of data,
wherein the first RAID controller is configured to:
obtain/receive a second copy of the block of data;
convert the second copy of the block of data into data stripes;
generate parity information for the data stripes; and
store the data stripes and parity information on the hard disk drives forming the first RAID array;
whereupon the hard disk drives of the first RAID array acknowledge hardened data stripes and parity information to the first RAID controller, the first RAID controller sends an acknowledge signal to the first file system; and the first file system sends a signal to the first NVMe drive to invalidate the first copy of the block of data in the first NVMe drive; and
wherein the data written to a first namespace on the first NVMe drive are copied through a non-transparent bridge between the first CPU and the second CPU and written to a first namespace on the second NVMe drive.

7. The computer system of claim 6,
wherein the second NVMe drive is configured to:
receive and store a first copy of another block of data,
wherein the second RAID controller is configured to:
obtain/receive a second copy of the another block of data;
convert the second copy of the another block of data into data stripes;
generate parity information for the data stripes; and
store the data stripes and parity information on the hard disk drives forming the second RAID array;
wherein data written by the second CPU are stored in a second namespace of the second NVMe drive, the data are then copied through the non-transparent bridge to the first CPU and written to a second namespace on the first NVMe drive.

8. The computer system of claim 6 wherein after a power loss, a first block of data in the first namespace of the first NVMe is copied to the first RAID controller and a second block of data in the second namespace of the second NVMe is copied to the second RAID controller.

9. A non-volatile memory-based cache appliance, comprising:
a plurality of non-volatile memory express (NMVe) drives, each NVMe drive defining at least one namespace;
a fabric switch coupled to the plurality of NVMe drives, wherein the fabric switch is coupled between a first server computer and a second server computer, each of the first and second server computers including a central processing unit (CPU), a system memory, and a redundant array of independent disks (RAID) controller coupled to a RAID array of hard disk drives;
wherein the first server computer is configured to:
write a first copy of a block of data to a first namespace on a first NVMe drive of the plurality of NVMe drives, and
write a second copy of the block of data to the RAID controller of the first server computer;
wherein the RAID controller for the first server computer is configured to:
stripe the data and generate parity information for the block of data, and
write the striped data and parity information to the RAID array of hard disk drives for the first server computer;
wherein the RAID array of hard disk drives for the first server computer return an acknowledge signal upon storing the data, and the acknowledge signal is used to initiate purging of the first copy of the block of data from the first namespace on the first NVMe drive.

10. The non-volatile memory-based cache appliance of claim 9,
wherein the CPUs of the first server computer and the second server computer are communicatively coupled via a non-transparent bridge; and
wherein a third copy of the block of data is copied via the non-transparent bridge from the CPU of the first server computer to the CPU of the second server computer; and,
wherein the CPU of the second server computer writes a fourth copy of the block of data to a first namespace in a second NVMe drive from the plurality of NMVe drives.

11. The non-volatile memory-based cache appliance of claim 10, wherein the acknowledge signal is communicated from the CPU of the first server computer to the CPU of the second server computer, and the CPU of the second server computer uses the acknowledge signal received from the CPU of the first server computer to initiate a purging of data of the first namespace on the second NVMe drive.

* * * * *